US010871382B2

(12) United States Patent
Lyden et al.

(10) Patent No.: US 10,871,382 B2
(45) Date of Patent: Dec. 22, 2020

(54) MEASUREMENT-DRIVEN ELECTRONIC DEVICE DESIGN ENVIRONMENT AND TECHNIQUES

(71) Applicant: Analog Devices International Unlimited Company, Limerick (IE)

(72) Inventors: Colin G. Lyden, Baltimore (IE); Claire Croke, Aherla (IE); Mack Roger Lund, Atlanta, GA (US); Alan Clohessy, County Clare (IE); Meabh Shine, Gouldavoher (IE); Rosemary B. Ryan, Annacotty (IE); Aine M. Joyce, County Clare (IE); Aine McCarthy, Carrigaline (IE); Mary McCarthy, Innishannon (IE); Thomas M. MacLeod, Clemmons, NC (US); Jason Cockrell, Norwood, MA (US); Michael C. W. Coln, Lexington, MA (US); Gustavo Castro, North Andover, MA (US); Sean Kowalik, Chelmsford, MA (US); Colm P. Ronan, Caherconlish (IE); Michael Edward Bradley, Limerick (IE); Michael Mueck, Andover, MA (US); Jonathan Ephraim David Hurwitz, Edinburgh (GB); Aileen Ritchie, Somerville, MA (US)

(73) Assignee: Analog Devices International Unlimited Company, Limerick (IE)

( * ) Notice: Subject to any disclaimer, the term of this patent is extended or adjusted under 35 U.S.C. 154(b) by 249 days.

(21) Appl. No.: 15/439,822

(22) Filed: Feb. 22, 2017

(65) Prior Publication Data
US 2017/0241804 A1 Aug. 24, 2017

Related U.S. Application Data

(60) Provisional application No. 62/298,328, filed on Feb. 22, 2016.

(51) Int. Cl.
G01D 18/00 (2006.01)
G01D 5/14 (2006.01)
G05B 19/042 (2006.01)

(52) U.S. Cl.
CPC .............. G01D 5/14 (2013.01); G01D 18/00 (2013.01); G05B 19/0426 (2013.01); *Y02P 90/02* (2015.11)

(58) Field of Classification Search
CPC ...... G01D 5/14; G01D 18/00; G05B 19/0426; Y02P 90/265
See application file for complete search history.

(56) References Cited

U.S. PATENT DOCUMENTS 4,311,965 A 1/1982 Jones
5,170,333 A 12/1992 Niwayama
(Continued)

FOREIGN PATENT DOCUMENTS

JP 62140076 A 6/1987
JP 814956 A 1/1996
(Continued)

OTHER PUBLICATIONS

"International Application Serial No. PCT/US2017/018979, International Search Report dated May 4, 2017", 5 pgs.
(Continued)

*Primary Examiner* — John E Breene
*Assistant Examiner* — Eyob Hagos
(74) *Attorney, Agent, or Firm* — Schwegman Lundberg & Woessner, P.A.

(57) ABSTRACT

Various examples are directed to configuring a configurable hardware module to perform a measurement of a physical quantity. A configuration manager may receive an indication of the physical quantity and performance factor data describing the measurement of the physical quantity. The configu-
(Continued)

ration manager may generate a hardware configuration of the hardware based at least in part on the indication of the physical quantity and the performance factor data. The hardware configuration may comprise instruction data to configure the hardware module to execute a dynamic measurement of the physical quantity. The configuration manager may also generate configuration data describing the hardware configuration, wherein the configuration data comprises simulation data comprising input parameters for a simulation of the hardware configuration and hardware configuration data for configuring a hardware module to implement at least a portion of the hardware configuration.

16 Claims, 23 Drawing Sheets

(56) References Cited

U.S. PATENT DOCUMENTS

| | | | |
|---|---|---|---|
| 5,586,305 A | 12/1996 | Eidson et al. | |
| 5,918,194 A * | 6/1999 | Banaska | G01D 3/022 340/3.1 |
| 6,393,385 B1 | 5/2002 | Pawar et al. | |
| 6,530,065 B1 * | 3/2003 | McDonald | G06F 17/5036 716/102 |
| 6,532,436 B2 | 3/2003 | Motz | |
| 6,832,182 B1 | 12/2004 | Wilson, Jr. | |
| 7,626,272 B2 | 12/2009 | Kemerling et al. | |
| 7,890,079 B2 | 2/2011 | Behzad et al. | |
| 7,903,008 B2 | 3/2011 | Regier | |
| 8,041,314 B2 | 10/2011 | Vilhonen | |
| 8,044,716 B1 | 10/2011 | Loeb | |
| 8,054,208 B2 | 11/2011 | Fletcher et al. | |
| 8,373,586 B2 | 2/2013 | Alley et al. | |
| 8,878,570 B2 | 11/2014 | Thomsen | |
| 2003/0036871 A1 * | 2/2003 | Fuller, III | G06F 9/44505 702/119 |
| 2006/0086112 A1 * | 4/2006 | Bloemer | F24F 3/153 62/176.6 |
| 2006/0236303 A1 | 10/2006 | Wilson, Jr. et al. | |
| 2014/0293663 A1 | 10/2014 | Ledezma et al. | |
| 2016/0066916 A1 * | 3/2016 | Overmyer | A61B 17/105 227/176.1 |
| 2016/0217237 A1 | 7/2016 | Kurosu et al. | |
| 2017/0242950 A1 | 8/2017 | Cockrell et al. | |

FOREIGN PATENT DOCUMENTS

| | | |
|---|---|---|
| JP | 8137515 A | 5/1996 |
| JP | 11248496 A | 9/1999 |
| WO | WO-0122037 A1 | 3/2001 |
| WO | WO-2017147205 A1 | 8/2017 |
| WO | WO-2017173143 A1 | 10/2017 |

OTHER PUBLICATIONS

"International Application Serial No. PCT/US2017/018979, Written Opinion dated May 4, 2017", 5 pgs.
"International Application Serial No. PCT/US2017/025066, International Search Report dated Jun. 16, 2017", 4 pgs.
"International Application Serial No. PCT/US2017/025066, Written Opinion dated Jun. 16, 2017", 6 pgs.
"International Application Serial No. PCT/US2017/025141, International Search Report dated Jun. 2, 2017", 4 pgs.
"International Application Serial No. PCT/US2017/025141, Written Opinion dated Jun. 2, 2017", 6 pgs.
Yepes, Alejandro G., et al., "Analysis and Design of Resonant Current Controllers for Voltage-Source Converters by Means of Nyquist Diagrams and Sensitivity Function", *IEEE Transactions on Industrial Electronics*, 58(11), (2011), 5231-5250.
"AnadigmApex dsASP Family User Manual", Anadigm, Inc. AN13x series, AN23x series, (2006), 36 pgs.
"Datasheet—Keysight Technologies M9295B PXIe Digital Stimulus/Response with PPME: 250 MHz, 16-channel", Keysight Technologies, (2016), 21 pgs.
"European Application Serial No. 17714041.5, Communication pursuant to Article 94(3) EPC dated May 27, 2019", 5 pgs.
"International Application Serial No. PCT/US2017/018979, International Preliminary Report on Patentability dated Sep. 7, 2018", 7 pgs.
"Parametric Measurement Unit and Supporting Components for ATE ApplicationsUsing the AD5522 PMU and the AD7685 16-Bit ADC", Analog Devices, Inc. Circuit Note, CN-0104, (2009), 4 pgs.
"Programmable IC delivers analog design", ApenCore, Inc., [Online]. Retrieved from the Internet on Jun. 23, 2016: <URL: http://www.electronicproducts.com/Analog_Mixed_Signal_ICs/Programmable_IC_delivers_analog_design.aspx>, (2016), 3 pgs.
Hassan, Mohammed F., "Field Programmable Analog Arrays: A Brief History", VLSI Egypt, [Online] Retrieved from the internet on Jun. 23, 2016: <URL: http://www.vlsiegypt.com/home/?p=1125>, (2016), 6 pgs.
Pankiewicz, Bogdan, et al., "A Field Programmable Analog Array for CMOS Continuous-Time OTA-C Filter Applications", IEEE Journal of Solid-State Circuits, 37(2), (Feb. 2002), 125-136.
"U.S. Appl. No. 15/474,167, Non Final Office Action dated Feb. 24, 2020", 25 pgs.
"U.S. Appl. No. 15/474,167, Response filed Nov. 7, 2019 to Restriction Requirement dated Aug. 7, 2019", 9 pgs.
"U.S. Appl. No. 15/474,167, Restriction Requirement dated Aug. 7, 2019", 8 pgs.
"CicuitLab", [Online]. Retrieved from the Internet: <https://web.archive.Org/web/2016031034346/https://www.circuitlab.com/>, (Mar. 16, 2016).
"European Application Serial No. 17714041.5, Communication Pursuant to Article 94(3) EPC dated Oct. 4, 2019", 4 pgs.
"Japanese Application Serial No. 2018-563399, Office Action dated Sep. 30, 2019", w/ English translation, 7 pgs.
"Wikipedia: Spectral Density", [Online], Retrieved from the Internet: <https://en.wikipedia.org/w/index.php?title=Spectral_density&oldid=660346818>, (May 2, 2015).
Rouphael, Tony, "Uniform Sampling of Signals and Automatic Gain Control", [Online]. Retrieved from the Internet: <<https://www.researchgate.net/publication/301176172_Uniform_Sampling_of_Signals_and_Automatic_Gain_Control/citation/download>, (2009).
"U.S. Appl. No. 15/474,167, Response filed May 26, 2020 to Non Final Office Action dated Feb. 24, 2020", 16 pgs.
"Japanese Application Serial No. 2018-563399, Notification of Reasons for Refusal dated Jul. 13, 2020", w/English Translation, 6 pgs.
"A Walkthrough of the Texas Instruments WEBENCH", [online]. [retrieved on Feb. 8, 2017]. Retrieved from the Internet: <URL: http://www.allaboutcircuits.com/news/an-introduction-to-the-texas-instruments-webench/>, (Aug. 6, 2016), 10 pgs.
"Motif Operational Simulator API", [online]. (c) 1995-2015 Analog Devices, Inc. Retrieved from the Internet: <URL: https://wiki.analog.com/resources/technical-guides/motifapi>, (Mar. 25, 2016), 6 pgs.
"Renesas Smart Analog", [online]. (c) 2012 Renesas Electronics Corporation. Retrieved from the Internet: <URL: https://www.renesas.com/ko-kr/doc/products/smart_analog/r01pf0054ej0101_sa.pdf>, (2012), 4 pgs.
"Texas Instruments releases free WEBENCH PCT Tool", [online]. [retrieved on Feb. 8, 2017]. Retrieved from the Internet: <URL: http://www.automation.com/library/resources/texas-instruments-releases-free-webench-pcb-tool>, (Jun. 10, 2014), 8 pgs.

* cited by examiner

MEASUREMENT-DRIVEN ELECTRONIC DEVICE DESIGN ENVIRONMENT AND TECHNIQUES

CLAIM OF PRIORITY

This application claims the benefit of priority of U.S. Provisional Application No. 62/298,328, filed Feb. 22, 2016, which is herein incorporated by reference in its entirety.

FIELD OF THE DISCLOSURE

This document pertains generally, but not by way of limitation, to design environments and techniques for generating hardware configurations for measuring physical quantities.

BACKGROUND

Electronic devices can be used to facilitate monitoring or control for a variety of applications such as chemical or industrial process control, motion control, building control such as for control of Heating, Ventilation, and Air Conditioning (HVAC), and remote monitoring or control, such as in the context of Supervisory Control and Data Acquisition (SCADA). Other applications for such electronic devices include embedded applications such as for protection or monitoring of electricity networks, smart metering, or other use by utilities or the electric power industry. Such devices can have inputs such as for monitoring current, voltage, or resistance (such as for measurement using Resistance Temperature Devices (RTDs)). Electronic devices can provide signal conditioning, such as including one or more of amplification, or filtering, and can provide analog-to-digital conversion capability.

SUMMARY

Various examples are directed to configuring a configurable hardware module to perform a measurement of a physical quantity. A configuration manager may receive an indication of the physical quantity and performance factor data describing the measurement of the physical quantity. The configuration manager may generate a hardware configuration of the hardware based at least in part on the indication of the physical quantity and the performance factor data. The hardware configuration may comprise instruction data to configure the hardware module to execute a dynamic measurement of the physical quantity. The configuration manager may also generate configuration data describing the hardware configuration, wherein the configuration data comprises simulation data comprising input parameters for a simulation of the hardware configuration and hardware configuration data for configuring a hardware module to implement at least a portion of the hardware configuration. Method and machine-readable medium examples are also described.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
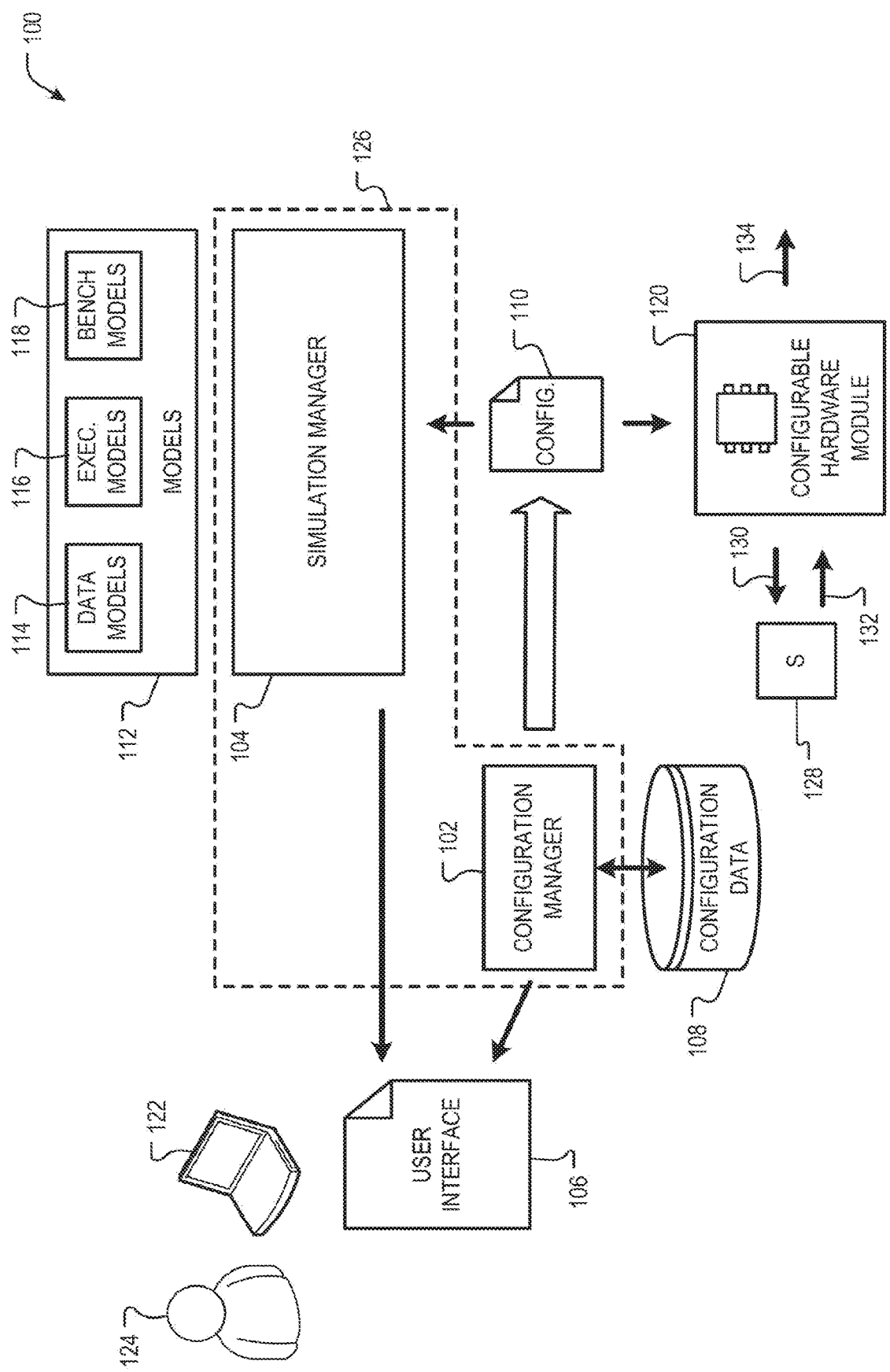
FIG. 1 is a diagram showing one example of an environment for generating and testing hardware configurations for measurement.

The present inventors have recognized, among other things, that electronic hardware devices, such as integrated devices or systems can provide a variety of user-configurable features. Such devices can include data conversion capability comprising complex signal chains having one or more of variable gain amplifiers, filter circuitry, and digitizing circuitry (e.g., including one or more analog-to-digital converters). Such devices can also include one or more processor circuits, such as including one or more general purpose processor circuits, or one or more application-specific circuits. Such circuits can include signal processing capability tailored to one or more specific applications. Such applications can include, for example, linearization of information obtained from a sensor or transducer coupled to a data conversion device. As an illustrative example, such processing can include processing tailored to a specified measurement function, such as including combining one or more of the signals being processed and applying a numerical technique or other application-specific signal conditioning.

In an example, an integrated electronic device can be used for measurements and can include bias or stimulus generation circuits, sometimes referred to as excitation generation circuits. Such stimulus generation circuits can be used to provide an excitation signal (e.g., a bias signal or field power) to feed a transducer or other load device coupled to the data conversion device. For example, the data conversion device may include one or more digital-to-analog converter circuits for converting a digital excitation signal to an analog excitation signal for a transducer.

The present inventors have also recognized, among other things, that providing a wide range of configuration options can present challenges to users of integrated measurement devices or other electronic circuits. For example, a user seeking a data conversion device (e.g., an analog-to-digital converter or a digital-to-analog converter) may have difficulty selecting or configuring a data conversion device for a particular application when faced with a broad range of different available devices, or when faced with a broad range of internal configuration options related to a particular device. As a result, the user may select a device that is inappropriate for a particular application, such as a device that fails to meet specified measurement performance objectives.

A design environment comprising an automated or semi-automated tool can be used to facilitate selection, simulation, and configuration of integrated devices, such as for measurement applications. Such a tool can be provided online for access via a network, or provided for use on a stand-alone device, such as distributed on a machine-readable medium (e.g., a compact-disc read-only-memory (CD-ROM) medium, a digital versatile disc read-only-memory (DVD-ROM) medium, or a memory technology devices such as a flash-memory device), or provided by download from a network.

A design flow using the design environment can be referred to as a portion of a "software-defined measurement" or SDM scheme. While such a scheme mentions "software," such a scheme can generally include one or more of selection, simulation, prototyping, and providing configuration information for a data conversion device or system comprising a flexible (e.g., configurable) integrated circuit device incorporating one or more data conversion devices. For example, a user can specify a measurement objective, such as a physical quantity defined in terms of a measurement parameter in units being measured (e.g., degrees C. or another parameter). Such a parameter need not be defined in terms of units measured directly by data conversion circuit or system. For example, such a measurement parameter need not be specified in terms of volts, voltage resolution, current, or current resolution, but can instead be specified in application-derived units describing the measured physical quantity such as physical units of temperature or pressure, as illustrative examples. The user can also specify one or more performance criteria or performance factors related to the measurement parameter, such as in terms of one or more of a measurement precision, a measurement accuracy, a range of values over which measurements can be made, or one or more other factors. Error contributions from one or more of the transducer or sensor, the data conversion device, signal conditioning circuitry, and signal processing can be used to estimate a total system error. Such a total system error can be compared against one or more performance factors such as to determine whether a particular combination of a transducer and data conversion device will be capable of meeting the specified criteria.

A software-defined measurement scheme can provide an interactive environment where devices capable of providing the specified measurement objective are identified. For example, available devices can be identified to a user and a range of adjustable parameters can be provided to the user to evaluate the performance of particular combinations of transducers and devices, or combinations of other elements of a measurement system.

More sophisticated or experienced users can enter specific hardware configurations for evaluation within the interactive environment without requiring the environment to provide candidate devices for selection for the entire signal chain. For example, a user may re-target an existing hardware configuration (such as an existing signal chain comprising one or more analog-to-digital converters or other functional elements) to a different measurement application. The interactive environment can be used to predict performance of a re-targeted system, such as when the user selects a different transducer for an otherwise existing hardware configuration (such as for a new use case or application for a measurement system) In such an example, the environment can provide an estimate of end-to-end system performance for the desired measurement, including an error contribution from the transducer or related processing such as linearization.

A user can use the environment to simulate one or more data conversion devices, such as using behavioral simulation models to explore various device alternatives or configurations. After one or more specific devices or device configurations are identified, a user can simulate an end-use application using a hardware module, such as can be integrated with tools to provide signal processing defined in either a software or hardware environment. In this manner, a user can move through a hierarchy including one or more of conversion device selection, device configuration, and behavioral simulation in a virtual manner "virtual evaluation"), and can incorporate "hardware in-the-loop" as development progresses. Portions of the signal chain in a simulated system can be hardware-implemented or hardware-emulated, at least in part, such as later in the development flow to analyze or validate performance. An output from the design environment can include configuration data such as for configuring a data conversion device for a specific application, such as using information about the measurement Objective to meet the specified performance factors.

A user need not proceed through an entirety of a design flow supported by the design environment. For example, a user could enter a measurement objective or other information and use a portion of an available tool set comprising the flow to address a particular need, such as device selection, such as based on a measurement objective or measurement performance factor(s). In another example, the user can select a specified device combination (e.g., including one or more of a transducer, a conversion device, signal conditioning, or other signal processing circuitry) for behavioral simulation without requiring use of a device selection tool to first narrow down a list of available devices.

The present inventors have also recognized a need for increased configurability and scalability in measurement-driven electronic hardware design. For example, configurable hardware used for prototyping is often unsuitable for scaling to production quantities without prohibitive per unit costs. Further, less configurable custom hardware, such as many application-specific integrated circuits (ASICs), are not cost effective for smaller production runs. Some examples described herein address this need by providing a hardware module having an analog front end with configurable excitation channels and input channels, data conversion devices, and control circuits, as described herein.

Some examples described herein also generate hardware configurations for configurable hardware modules, where the hardware configurations include instruction data to configure the configurable hardware module to implement a dynamic measurement. The configurable hardware module may implement a dynamic measurement, for example, by changing the way that it measures the physical quantity over time, for example, by changing the excitation of the sensor and/or treating an input signal from the sensor differently at different times.

FIG. 1 is a diagram showing one example of an environment 100 for generating and testing hardware configurations for measurement. The environment 100 includes a configuration manager 102 and a simulation manager 104 that, collectively and/or individually generate a user interface (IU) 106. The UI 106 is provided to a user 124 via a user computing device 122. The user 124 may utilize the UI 106 to interact with the configuration manager 102 and/or simulation manager 104 to generate one or more hardware configurations for a configurable hardware module 120 and/or simulate one or more hardware configurations for the configurable hardware module 120.

The configuration manager 102 and simulation manager 104 may comprise software code executed by a server 126. In FIG. 1, a single server 126 executes both the configuration manager 102 and simulation manager 104. In some examples, however, the configuration manager 102 and simulation manager 104 may be executed on two or more different servers or other suitable computing devices.

The UI 106 may be generated by the configuration manager 102 and/or simulation manager 104 and may be served to the user computing device 122 in any suitable manner. In some examples, the configuration manager 102 and/or simulation manager 104 may include or be in communication with a web server for providing the UI 106 to the user computing device 122 via the Internet or other suitable network. The user computing device 122 may be any suitable computing device such as, for example, a laptop computer, a tablet computer, a desktop computer, a mobile computing device, etc. The configuration manager 102 and/or simulation manager 104 may populate the UI 106 to provide the user 124 with design and simulation functionality for measurement-driven electronic hardware.

The user 124 may provide the configuration manager 102 and/or simulation manager 104 with a physical property to be measured and performance factors via the UI 106. The physical quantity may be any physical quantity that can be measured, directly or indirectly, by a transducer or other sensor 128 that is a part of and/or in communication with the configurable hardware module 120. Examples of physical quantities that may be measured include temperature, pressure, light, weight, force, touch, proximity, flow, chemical quantities such as acidity or pH, etc. Performance factors may describe the measurement and may include, for example, a measurement precision, a measurement accuracy, a range of values over which measurements can be made, etc.

The configuration manager 102 may utilize the received physical quantity and performance factors to generate a hardware configuration for the configurable hardware module 120. For example, the configuration manager 102 may select a sensor 128 suitable for measuring the physical quantity indicated by the physical quantity and performance factors. In some examples, the configuration manager 102 may receive data regarding potential sensors 128 and/or hardware configurations from a configuration data store 108 which may be in communication with the configuration manager 102.

The configuration manager 102, may also generate configuration data 110, for example, also based on the received design parameters, Configuration data 110 may describe one or more hardware configurations for the configurable hardware module 120 (for example, derived from the design parameters). For example, configuration data 110 may include hardware configuration data comprising instructions and/or programming parameters for generating the hardware configuration at the configurable hardware module 120 to implement a hardware configuration. For example, the hardware configuration data may describe a state or states of various switches at the configurable hardware module 120, firmware or other instructions to be executed at a control circuit of the configurable hardware module 120, etc. Configuration data 110 may also include simulation data including input parameters for simulating the hardware configuration, for example, utilizing the simulation manager 104. In some examples, the configuration data 110 may also include one or more configurations for all or part of the UI 106, for example, as described herein.

The configurable hardware module 120 may receive the hardware configuration data to implement the hardware configuration. For example, the configurable hardware module 120 may implement the hardware configuration to measure the physical quantity according to the performance factors, for example, utilizing the sensor 128. The sensor 128 may be or include any suitable transducer or other sensor for measuring the physical quantity. For example, when the physical quantity is temperature, the sensor 128 may be thermocouple or other suitable temperature sensor. When the physical quantity is a pressure, the sensor 128 may be or include a piezoelectric sensor or other suitable sensor. When the physical quantity is proximity, the sensor 128 may be or include a capacitive pressure sensor. Other suitable sensors may be used for these and other physical quantities.

According to the hardware configuration, the configurable hardware module 120 may provide an excitation signal 130 to the sensor 128 and receive a sensor signal 132 from the sensor 128. For example, the excitation signal 130 may be a bias signal or field power signal for allowing the sensor 128 to generate a current, voltage, or other signal indicating the physical quantity (e.g., the sensor signal 132). The configurable hardware module 120 may also receive the sensor signal 132 and generate a physical quantity signal 134, which may be digital, and may indicate the physical quantity.

The type of sensor 128 selected may determine the type of excitation signal 130 provided and the type of sensor signal 132 received. For example, a force voltage/measure voltage (FVMV) sensor may receive an excitation signal 130 with a predetermined voltage and generate a sensor signal 132 where the voltage of the sensor signal 132 indicates the physical quantity. A force voltage/measure current (FVMI) sensor may receive an excitation signal 130 with a predetermined voltage and generate a sensor signal 132 where the current of the sensor signal 132 indicates the physical quantity. A force current/measure voltage (FIMV) sensor may receive an excitation signal 130 with a predetermined current and generate a sensor signal 132 where the voltage of the sensor signal 132 indicates the physical quantity. A force current/measure current (FIMI) sensor may receive an excitation signal 130 with a predetermined current and generate a sensor signal 132 where the current of the sensor signal 132 indicates the physical quantity. A force nothing/measure voltage (FNMV) sensor may receive no excitation signal 130 and generate a sensor signal 132 where the voltage of the sensor signal 132 indicates the physical quantity. A force nothing/measure current (FNMI) sensor may receive no excitation signal 130 and generate a sensor signal 132 where the current of the sensor signal 132 indicates the physical quantity.

In some examples, the configuration manager 102 may also generate the hardware configuration to implement hardware and/or software for processing the sensor signal 132. Any suitable processing of the sensor signal 132 may be performed. In some examples, the hardware configuration may specify processing to compensate for a characteristic of the sensor 128. For example, some sensors, such as Rogowski coils, generate a sensor signal 132 where the physical quantity is indicated as a change in the current (or voltage) of the sensor signal 132 over time. In order to obtain a flat frequency response from sensors of this type, the hardware configuration may describe an integrator to be placed in the signal path. The integrator may be implemented in hardware or software.

In some examples, the hardware configuration may specify processing to reduce or represent a measurement of a physical quantity in a different form, such as a form that contains an indication of the physical quantity but less data. For example, reducing a measurement may include finding a half-wave root mean square (RMS) value from a stream of measurements of a physical quantity. Such a reduction may be implemented in hardware or software.

In some examples, the hardware configuration may indicate a combination of data from more than one data stream to generate a measurement of the physical quantity. For example, the configurable hardware module 120 may receive multiple sensor signals 132, each from a different sensor 128. The hardware configuration may specify a hardware and/or software arrangement to combine the multiple sensor signals 132. For example, the physical quantity of power may be measured by multiplying a sensor signal 132 indicating voltage with another sensor signal 132 indicating current.

In some examples, the hardware configuration may indicate multiple channels (e.g., input channels) that receive the same sensor signal 132 and process the sensor signal 132 differently. For example, two input channels receiving the same sensor signal 132 may have different gains. The hardware configuration may specify a hardware and/or software mechanism for merging the two input channels, for example, to obtain an extended dynamic range version of the single sensor signal 132.

In some examples, the hardware configuration may indicate hardware and/or software features for extracting multiple data streams from a single sensor signal 132. For example, a lower latency, lower signal-to-noise ratio (SNR) signal may be used for protection algorithms while a higher latency, higher SNR signal may be used to generate a measurement of the physical quantity.

In some examples, the hardware configuration may indicate hardware and/or software features for combining multiple input signals 132 indicating the same physical quantity to generate a single data stream. For example, the configurable hardware module 120 may receive two sensor signals 132 from two different current transformers with different transfer functions and/or saturations, where each sensor signal 132 is received via a separate input channels. Data streams at the separate input channels may be merged. Mismatch or saturation, if present, may be compensated for, for example, at a control circuit of the configurable hardware module.

The configuration data 110 may also include simulation data. The simulation data may be provided to the simulation manager 104 to facilitate a simulation of one or more hardware configurations generated by the configuration manager 102. The simulation data may include various data for facilitating the simulation such as, for example, an identification of one or more models 112 to be used in the simulation, a description of one or more generators to be used in the simulation, a description of one or more analyses to be performed in the simulation, etc. The simulation manager 104 may utilize the simulation data to call and/or execute one or more models of one or more hardware configuration described by the configuration data 110.

Any suitable type of model may be used. In some examples, the simulation manager 104 may utilize a data model 114 to simulate some or all of a hardware configuration. For example, a data model 114 may describe the response of some or all of a hardware configuration as data stored, for example, at a database, table or other suitable data structures. In some examples, the simulation manager 104 may utilize an executable model 116 to simulate some or all of a hardware configuration. An executable model may be any suitable model executed in the simulation manager (e.g., by e server 126) or at another suitable computing device. Examples of executable models may include a Simulation Program with Integrated Circuit Emphasis(SPICE) model, Model Operation Through the Implementation of Features (MOTIF) model, etc. In some examples, the simulation manager 104 may utilize a bench model 118 to simulation some or all of a hardware combination. A bench model 118 may be a "hardware-in-the-loop" model where a physical component is provided with a generator signal and its response is measured.

Figure 2:
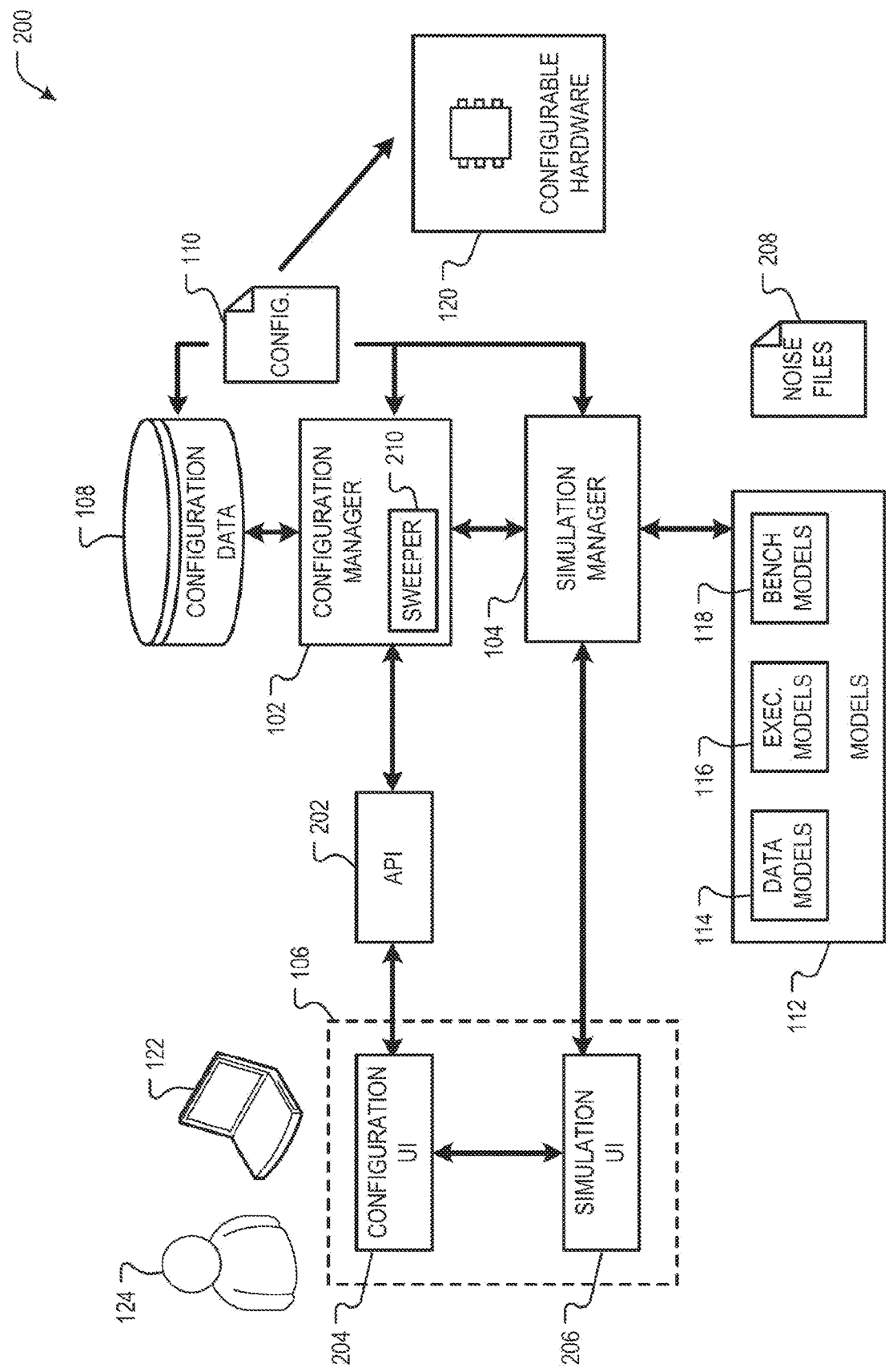
FIG. 2 is a diagram showing another example environment for generating and testing hardware configurations for measurement.

FIG. 2 is a diagram showing another example environment 200 for generating and testing hardware configurations for measurement. For example, the environment 200 may be an alternative configuration of the environment 100 described with respect to FIG. 1. The environment 200 includes a configuration UI 204 and a simulation UI 206. The respective UIs 204, 206 are shown as components of the UI 106, although in some examples, the UIs 204, 206 may be separately generated and served to the user computing device 122. In some examples, one or both of the configuration UI 204 and/or the simulation UI 206 may be or include executable web clients executing at the user computing device 122. An Application Programming Interface (API) 202 is positioned between the configuration UI 204 and the configuration manager 102. For example, the configuration UI 204 may contact or otherwise interact with the configuration manager 102 via the API 202 utilizing commands and/or syntax consistent with the API 202. Similarly, the configuration manager 102 may contact or otherwise interact with the configuration UI 204 utilizing commands and/or syntax consistent with the API 202, The API 202 may be any suitable API utilizing any suitable syntax or technique. In some examples, the API 202 is configured according to Representational State Transfer (REST) principles.

In the example of FIG. 2, the configuration manager 102 comprises a sweeper 210. The sweeper 210 may be configured to utilize the simulation manager 104 to pre-simulate hardware configurations for the configurable hardware module 120. For example, the sweeper 210 may receive and/or generate potential hardware configurations for the configurable hardware module 120. The potential hardware configurations generated by the sweeper 210 may include, for example, sensors, such as the sensor 128 of FIG. 1, to be used with the configurable hardware module 120. The sweeper 210 may request that the simulation manager 104 execute simulations of the various hardware configurations. Results of the simulations, including, for example, noise files 208 describing noise characteristics of the modeled hardware configurations, may be provided to the configuration data store 108 to be utilized by the configuration manager 102 when determining hardware configurations in response to customer queries. The simulation manager 104 may also provide the simulation UI 206 to the user 124 (e.g., as a part of the overall UI 106). For example, the user 124 may perform additional simulations of a hardware configuration, for example, as described herein.

Figure 3:
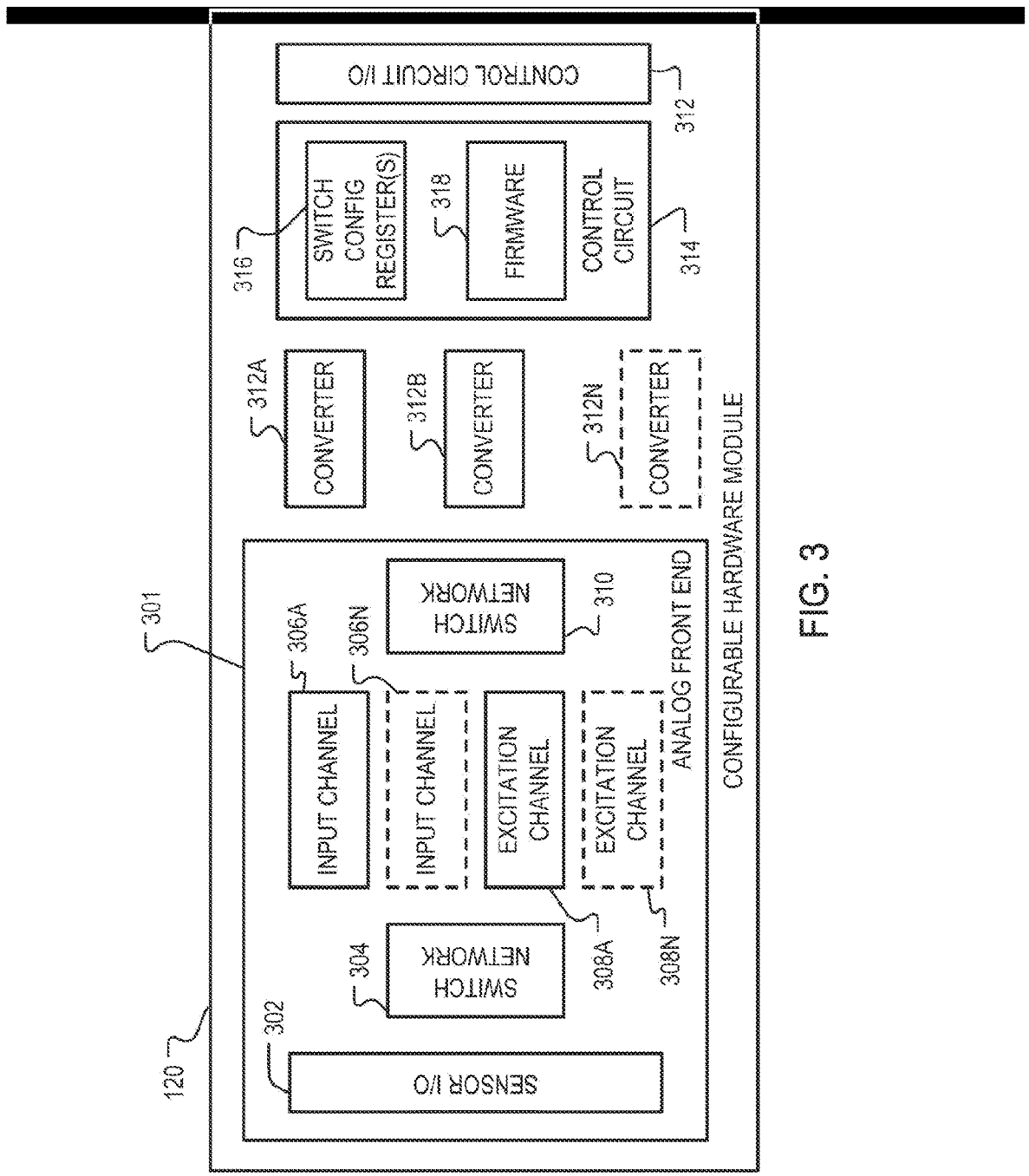
FIG. 3 is a diagram showing one example arrangement of the configurable hardware module.

FIG. 3 is a diagram showing one example arrangement of the configurable hardware module 120. In the example of FIG. 3, the configurable hardware module 120 comprises an analog front end 301, converters 312A, 312B, 312N, and a control circuit 314. The analog front end 301 comprises a sensor input/output (I/O) module 302, switch networks 304, 310, input channels 306A, 306N, and excitation channels 308A, 308N.

The control circuit 314 may generate one or more excitation signals (e.g., digital excitation signals) and provide the generated digital excitation signal to a digital-to-analog converter (DAC) of the converters 312A, 312B, 312N to generate an analog excitation signal. The DAC may provide the to an excitation channel 308A, 308N, which may provide various processes such as amplification, filtering, etc. to condition the analog excitation signal, generating a conditioned excitation signal. The conditioned excitation signal may be provided to a sensor, such as the sensor 128 (FIG. 1) via the sensor I/O module 302, which may include one or more pins or other I/O devices for coupling to a sensor. The conditioned excitation signal may be, for example, of a constant voltage, of a constant current, or of any other suitable form.

The sensor signal may be received via the sensor I/O module 302 and provided to an input channel 306A, 306N, which may provide amplification, filtering, and/or other signal conditioning to provide a conditioned analog sensor signal to an analog-to-digital converter (ADC) of the converters 312A, 312B, 312N to generate a digital sensor signal. In some examples, input channels 306A, 306N may also include hardware for implementing integrators, etc., to compensate for different sensor characteristics, hardware for extracting or reducing a measurement, etc., as described herein. The digital sensor signal may be provided to the control circuit 314, which may generate a digital output signal available via the control circuit I/O module 312. The control circuit I/O module 312 may include hardware for implementing any suitable protocol (e.g., digital protocol) such as, for example, Universal Serial Bus (USB), etc.

In the example of FIG. 3, the configurable hardware module 120 may assume different hardware configurations, for example, when the states of the switch networks 304, 310 and the control circuit 314 are modified. For example, switch network 304 may selectively couple one or more of the input channels 306A, 306N and/or excitation channels 308A, 308N to the sensor I/O module 302. The switch network 310 may selectively couple one or more of the input channels 306A, 306N and/or excitation channels 308A, 308N to one or more of the converters 312A, 312B, 312N, The switch networks 304, 310 may also switch various components into or out of an input channel 306A, 306N or excitation channel 308A, 308N, for example, to implement filters, integrators, amplifiers, and/or modify the properties thereof. Data for configuring a switch network 304, 310 to implement an excitation channel may be referred to as excitation channel data and data for configuring a switch network 304, 310 to implement an input channel may be referred to as input channel data.

In some examples, the control circuit 314 may comprise firmware 318 and/or one or more switch configuration registers 316 for setting the states of the switch networks 304, 310 and the control circuit. For example, switch control registers 316 may be memory mapped from a processor unit of the control circuit 314. For example, the control circuit 314 may write a register map setting to the switch configuration registers 316, where the value of the register map setting sets the state of the switch networks 304, 310. For example, a register map setting may include input channel data and/or excitation channel data. Firmware 318 may include any suitable software code to be executed by the control circuit 314 and/or a processor unit (e.g., digital signal processor or DSP) thereof. For example, firmware 318, when executed at the control circuit 314, may cause the control circuit 314 to generate a particular type of digital excitation signal and/or receive and process any suitable type of sensor signal. Firmware 318, in some examples, may include instructions for configuring a gain or other properties of amplifiers or other components of the input channels 306A, 306N and output channels 308A, 308N. Although the example of FIG. 3 shows firmware 318, control circuits in various examples may receive and/or process various other kinds of instructions including firmware written to a read-only memory as well as instructions written to other types of memory.

The arrangement shown in FIG. 3 is but one example of the configurable hardware module 120. Although two input channels 306A, 306N and two excitation channels 308A, 308N are shown, any suitable number of input and/or excitation channels may be included. Also, in some examples, input and/or excitation channels may be generated from components of the analog front end 301 based on the state of one or more of the switch networks 304, 310. For example, one or more amplifiers, filters, passive components, etc., of the analog front end may be utilized in an excitation channel or an input channel, for example, depending on the state of the switch networks 304, 310. Although three converters 312A, 312B, 312N are shown, any suitable number of converters maybe included. Further, although multiple switch networks 304, 310 are shown, any suitable number of switch networks may be used including a single switch network or more than two switch networks.

The configurable hardware module 120 shown in FIG. 3 may enable a number of hardware configurations have different capabilities, for example, based on the requirements of the user 124. In some examples, the control circuit 314 may be configured to, depending on the hardware configuration, trade off speed and/or latency for dynamic range. For example, the control circuit 314 may implement a digital filter to increase the dynamic range of the sensor signal by applying an over sampling (OS) or other filter, although this may increase latency and decrease speed. Similarly, the control circuit 314 may be configured to pass the sensor signal 132 with less time consuming processing so as to reduce latency and increase speed. In some examples, the control circuit 314 may be configured to generate an interrupt signal, for example, by applying a threshold to the sensor signal 132 or a processed version of the same signal. The control circuit 314, in some examples, may process simultaneous data streams from the same channel. For example, the control circuit 314 may receive the same sensor signal 132 and separate apply minimal processing, threshold processing, a digital filter, and/or various digital filters in parallel.

Examples of the configurable hardware module 120 including multiple input channels 306A, 306N may provide additional configurability. For example, a sensor signal 132 may be provided to multiple channels 306A, 306N, with the different channels 306A, 306N having amplifiers with different gains. The channels 306A, 306N receiving the sensor signal 132 may be combined, for example, after being converted by converter 312A, 312N, This may generate a combined data stream with increased dynamic range, as described herein. In another example, the sensor signal 132 may be provided to separate channels 306A, 306N and separate converters 312A, 312N and time interleaved to as to increase the available sample rate.

The control circuit 314 (e.g., via firmware 318) may also be configured to perform various other signal processing including, for example, smart metering applications, di/dt integrator for Rogowski coil support, multipoint phase calibration, etc. The control circuit 314 may also be configured to perform various low level support algorithms such as, for example, line frequency measurement, time stamping, zero crossing detection, synchrophasor calculation, ½ cycle RMS measurement, metrology functions, etc. The control circuit 314 may also be configured to perform various system monitoring functions such as digital test waveform generation, on-chip diagnostics, etc.

In some examples, the control circuit 314 or other circuitry in the configurable hardware module 120 may be configured to perform safety functions such as, for example, sensor disconnect upon fault detection, power supply low drop-out rate (LDO) monitoring, supply voltage monitoring, serial peripheral interface (SPI) monitoring (e.g., of the control circuit module 312), register content monitoring, cyclical redundancy checking (CRC), etc. Other potential diagnostic functions that may be implemented by control circuit 314 or other suitable circuitry in the configurable hardware module 120 may include, determining if a capacitor is missing on the reference pin, voltage reference monitoring, over and under voltage input detection, a busy signal stuck detection, and gain setting validation.

Figure 4:
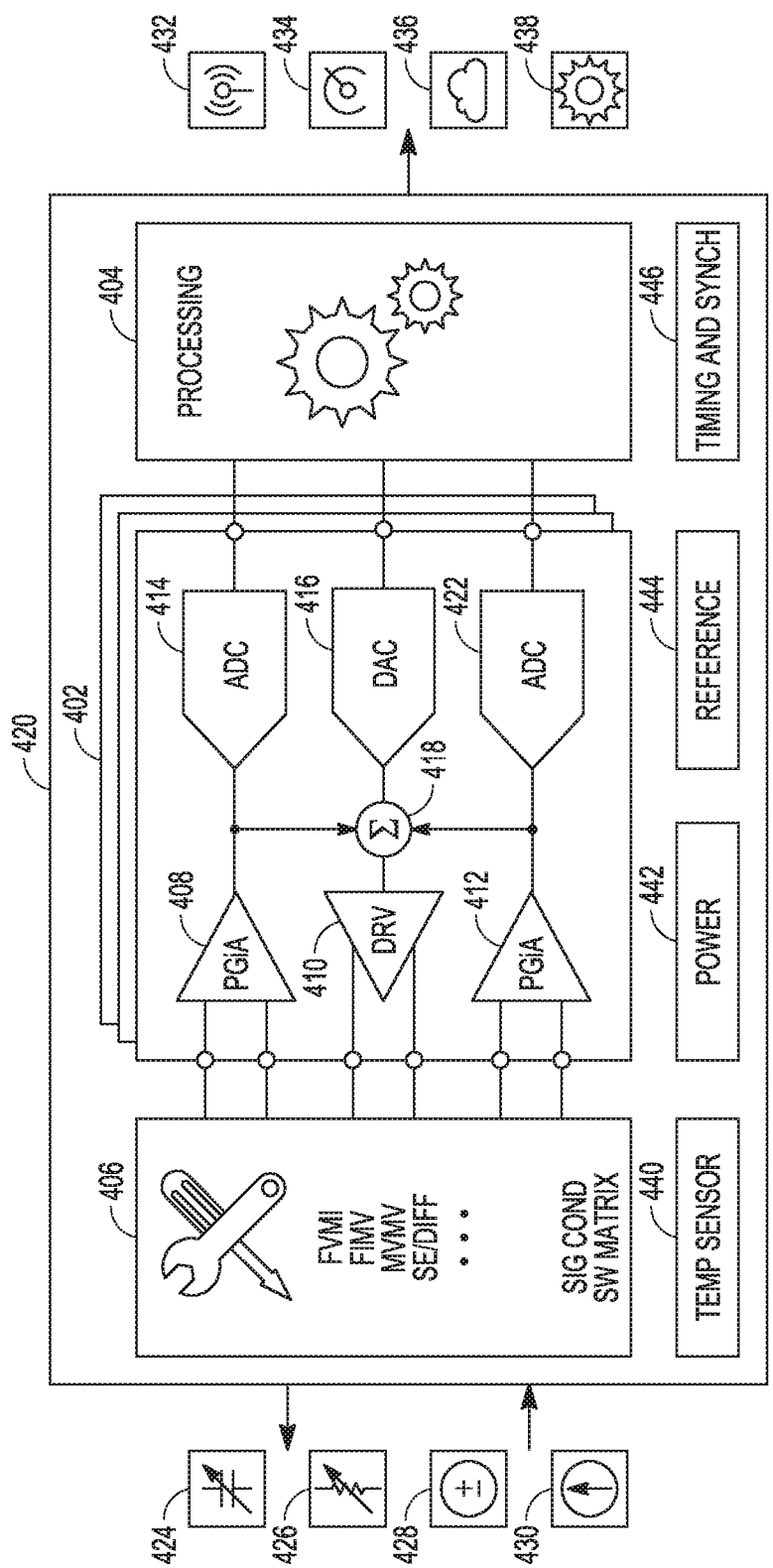
FIG. 4 is a diagram showing another example arrangement of a configurable hardware module.

FIG. 4 is a diagram showing another example arrangement of a configurable hardware module 420. The configurable hardware module 420 comprises an analog front end 402, a processing or control circuit 404 and a signal conditioning switch network 406 controllable by the control circuit 404. The analog front end 402 includes various amplifiers 408, 410, and 412. For example, amplifiers 408 and 412 may be programmable gain input amplifiers, with gain that is programmable by the control circuit 404. For example, one or both of amplifiers 408, 412 may be part of an input channel. The amplifier 410 may be a drive amplifier configured to amplify an analog excitation signal, for example, for conditioning. A summer 418 may be used, for example, to sum the outputs of multiple other components. For example, in some hardware configurations, the configurable hardware module 420 may utilize a single input channel including both of the amplifiers 408, 412 and the summer. Converters 414, 416, 422 include ADC's 414, 422 and DAC 416. The converters 414, 416, 422 may, in some examples, also be configured, for example, by the control circuit 404 and/or by the switch network 406.

FIG. 4 shows additional components of the configurable hardware module 420 including, for example, a temperature sensor 440, a power supply 442, a reference voltage (or current) generator 444, and a timing and synchronization circuit 446. FIG. 4 also shows example sensor types 424, 426, 428, 430 that may be coupled to the configurable hardware module 420 to measure one or more physical quantities. For example, a capacitive sensor 424 may be used to measure various physical quantities such as proximity, thickness, etc. A resistive sensor 426 may be used to measure various physical quantities such as pressure, temperature, etc. A voltage sensor 428 may similarly be used to measure various physical quantities such as, for example, pressure, light, etc. A current sensor 430 may be used to measure various physical quantities such as light, etc.

Additionally, FIG. 4 shows example uses of the output of the configurable hardware module 420. In some examples, a wireless output 432 indicating the physical quantity is provided to another computing device (e.g., a controller). In some examples, a wired output 434 indicating the physical quantity is provided to another computing device. In some examples, the output indicating the physical quantity is provided to an Internet or cloud system 436. Also, in some examples, the output indicating the physical quantity may be provided to a device setup function 438. For example, the physical quantity may be temperature or other physical quantity that tends to change if a computing or other device is at risk of failure. Providing the physical quantity to a device setup function 438 may enable the device to modify its operation to avoid damage from overheating or another detectable condition.

Figure 5:
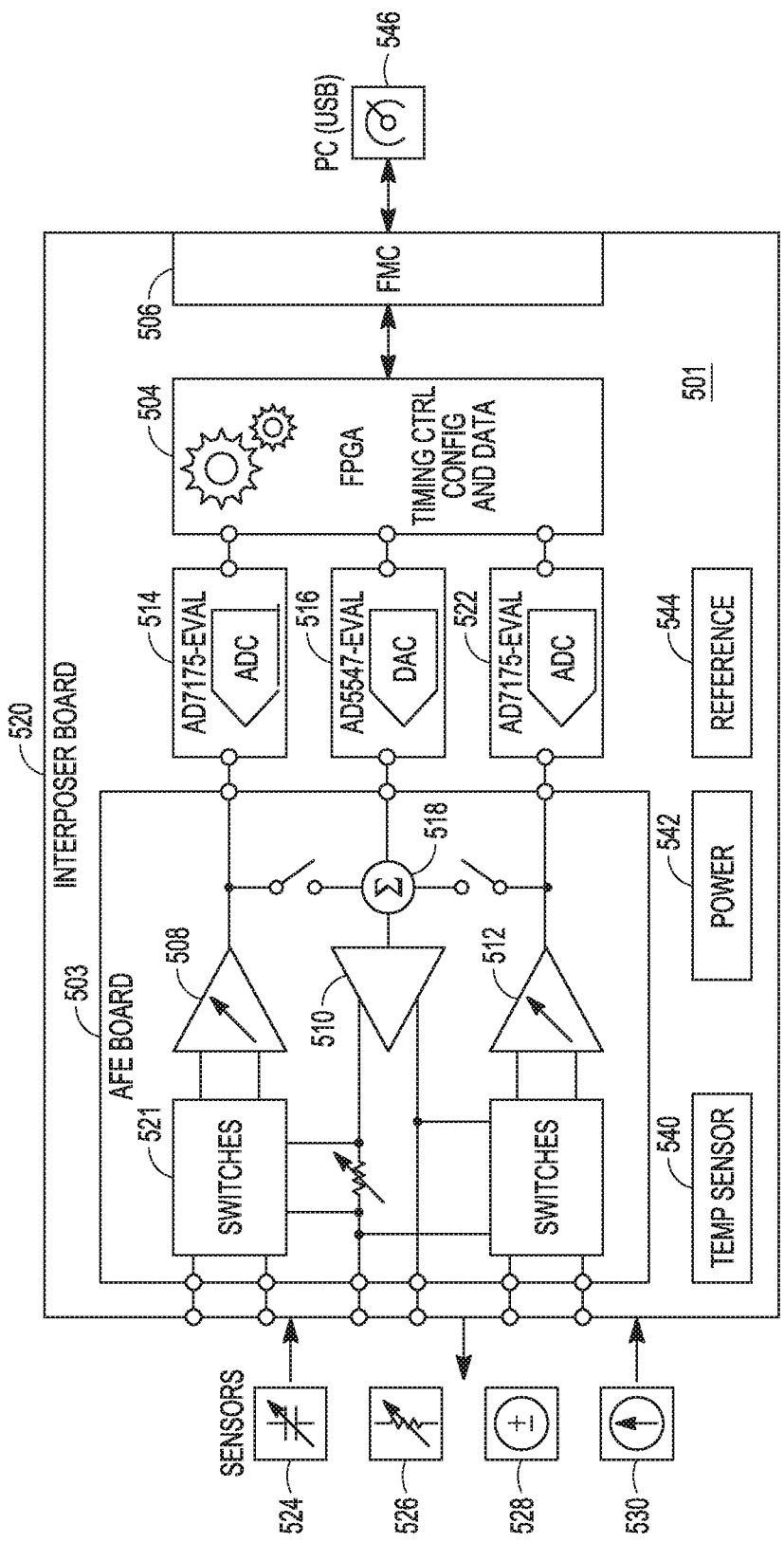
FIG. 5 is a diagram showing yet another example arrangement of a configurable hardware module.

FIG. 5 is a diagram showing yet another example arrangement of a configurable hardware module 520. The configurable hardware module 520 comprises an interposer board 501, an analog front end (AFE) board 503, and a control circuit 504, which may include a field programmable gate array (FPGA) that includes and/or implements a suitable processor unit. Although the AFE board 503 is shown separate from the interposer board 501, in some examples, the AFE and other various components of the configurable hardware module 520 may be implemented on the same physical board, and/or within a single integrated circuit (IC).

The AFE board 503 includes various amplifiers 508, 510, and 512. For example, amplifiers 508 and 512 may be configurable gain amplifiers having a gain that is configurable by the control circuit 504, similar to the amplifiers 408 and 412 described above. The summer 518 may operate similar to the summer 418 described herein. The AFE board 503 also includes switch networks 521, 523, which may be settable by the control circuit 504 to configure the other components of the AFE board 503. In some examples, the AFE board 503 may include various other components for configuring input channels and/or output channels including, for example, various switches, potentiometers, capacitors, etc. For example, resistors and/or capacitors may be utilized to modify the gain, feedback, or other characteristics of the amplifiers 508, 510, 512, of converters 514, 516, 522, etc.

Converters 514, 516, 522 and summer 518 may operate similar to converters 414, 416, 422 and summer 418 described herein. FIG. 5 also shows example sensor types 524, 526, 528, 530, which may operate in a manner similar to the sensor types 424, 426, 428, 430 described herein. An example output 546 of the configurable hardware module 520 may be provided, for example, via a USB or other suitable connection via a control circuit output 506. FIG. 5 shows additional components of the configurable hardware module 520 including, for example, a temperature sensor 540, a power supply 542, and a reference voltage (or current) generator 544.

As described herein, the configuration manager 102 may generate configuration data 110 for a particular hardware configuration of a configurable hardware module, such as 120, 420, 520, etc. As described herein, configuration data 110 may include hardware configuration data for implementing the hardware configuration at a configurable hardware module, such as 120, 420, 520 and simulation data for simulating the hardware configuration.

In some examples, the configuration manager 102 may be configured to generate hardware configurations for different configurable hardware modules 120, 420, 520. For example, the configuration data store 108 may include data describing different configurable hardware modules 120, 420, 520, for example, having different types of components such as amplifiers and converters, different ranges of allowable component configuration, different numbers and/or types of available input and/or output channels, different switch networks and/or mechanisms for programming switch networks, different control circuit types, etc. The configuration manager 102 may select a configuration hardware module 120, 420, 520, for example, based on the physical quantity and/or performance factors provided by the user 124. In other examples, the user 124 may specify a configurable hardware module 120, 420, 520 for use.

Figure 6:
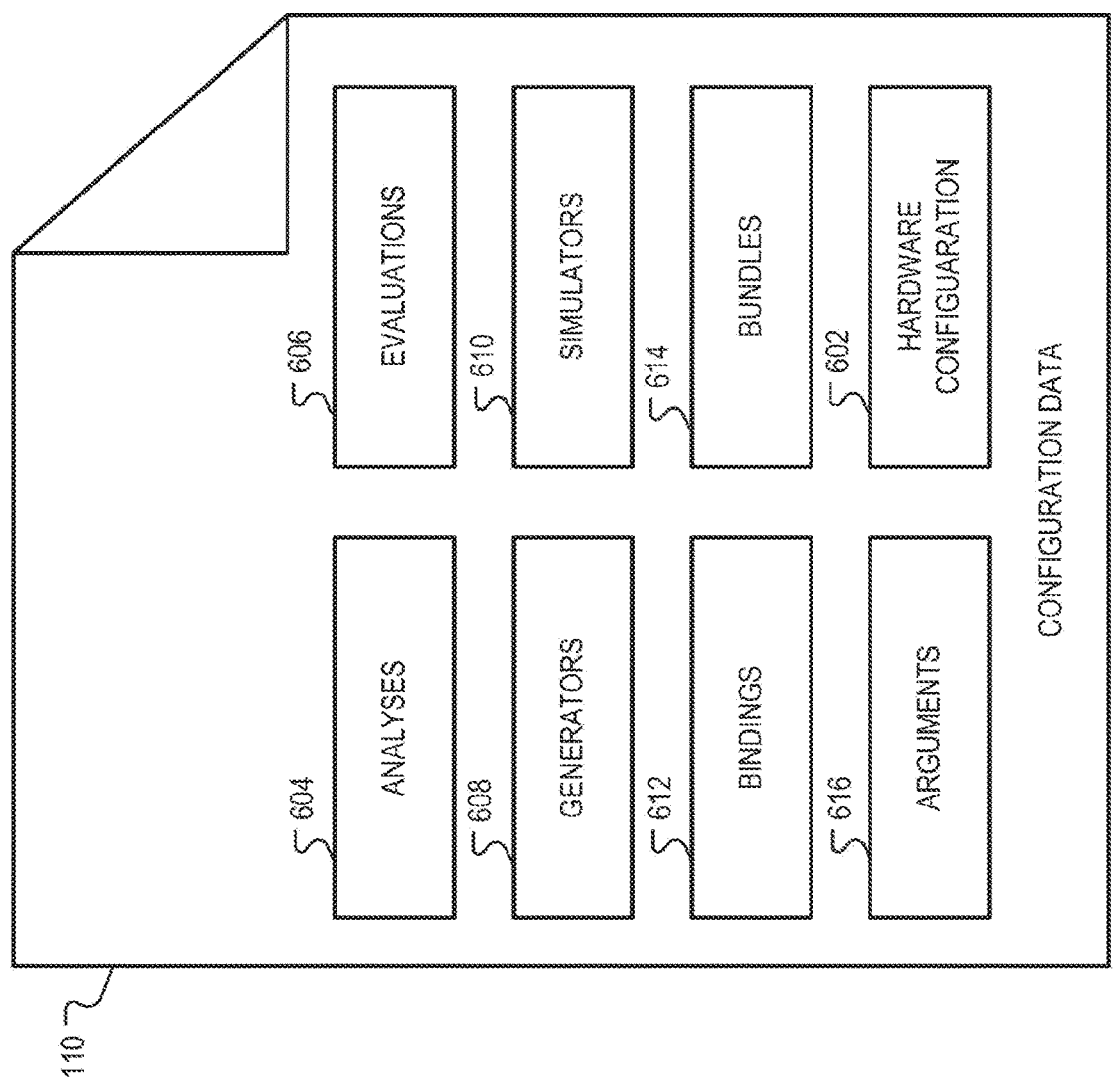
FIG. 6 is a diagram showing one example arrangement of configuration data for a hardware configuration of a configurable hardware module.

FIG. 6 is a diagram showing one example arrangement of configuration data 110 for a hardware configuration of a configurable hardware module, such as 120, 420, 520 described herein. The configuration data 110 includes hardware configuration data 602 as well as simulation data including, for example, argument data 616, binding data 612, bundles data 614, generator data 608, simulator data 610, analysis data 604, and evaluation data 606.

Hardware configuration data 602 may include any suitable data for implementing a particular hardware configuration at a configurable hardware module. For example, hardware configuration data 602 may include switch data describing the configuration of one or more switches to implement one or more input channels and/or one or more excitation channels. Such data may be in any suitable form. In some examples, switch data may include one or more register maps that may be written to a register of a processing unit of the control circuit for the configurable hardware module. In some examples, hardware configuration data may also include instruction data. Instruction data may include instructions to be executed at a control circuit to generate one or more excitation signals and/or process one or more sensor signals from a transducer or other sensor.

Simulation data for simulating the hardware configuration may include values and/or data structures that relate the selected hardware configuration to one or more simulators. For example, argument data 616 may describe one or more arguments for a simulation. Arguments may include parameters describing a hardware configuration or any other suitable condition for a simulation. Example arguments include, a starting voltage for a simulation, a frequency of an input signal for the simulation, etc. Argument data 616 may express arguments utilizing any suitable data type or data form.

In some examples, arguments described by argument data 616 provide a common format for receiving input parameters for simulation (e.g., simulation input parameters). For example, arguments, as described herein, may allow the UI 106 to provide and/or request simulation input parameters from the user 124 in the form of a consistent way regardless of the underlying simulator(s), generator(s), evaluation(s), or analysis or analyses used. Similarly, the use of arguments, as described herein, may allow the configuration manager 102 to generate simulation input parameters that may be utilized regardless of the particular underlying simulator(s), generator(s), evaluation(s), or analyses used to simulate the hardware configuration.

In some examples, an argument may describe a particular simulation input parameter as well as metadata describing the simulation input parameter such as, for example, minimum values for the argument, maximum values for the argument, units for the parameter, other descriptors of the parameter, etc. Argument data 616 may describe arguments using any suitable syntax such as, for example, eXtensible Markup Language (XML), C#, etc. An example description of an argument for a simulation start voltage is provided below:

```
<Args>
  <Float Name="vStart" DisplayName="Start Voltage" Unit="V" Value="0.001" />
  <Toggle Name="fsOrODR" DisplayName="Control FS or ODR" Value="FS">
      <Option>FS</Option>
      <Option>ODR</Option>
  </Toggle>
</Args>
```

In the example, the argument vStart provides an argument name, an argument value, and an argument selection, fsOrODR. FsOrODR may indicate whether the start voltage is to have a specified output data rate (ODR) or a specified sampling frequency.

Binding data 612 may describe one or more bindings. Bindings may be or include data structures that relate one or more arguments to a specific simulator, generator, evaluation, or analysis. Bindings may describe transformations to be performed on one or more arguments. For example, referring to the start voltage above, a particular simulator, generator, evaluation, or analysis may expect to receive a start voltage expressed in millivolts (mV). On the other hand, an argument, such as the example provided above, may provide voltage in volts. A binding may transform the argument to the input expected by the simulator, generator, evaluation, or analysis. In some examples, a transformation described by a binding may include multiple arguments. The example code below indicates two bindings. A first binding indicates that an argument called 4800OverODR is equal to 4800 divided by the value of another argument odr. A second binding indicates that the internal sampling frequency, fsInternal is set to an argument fsbits, if fsOrODR has the value FS, but is set to the value of 4800OverODRiffsOrODR has the value ODR:

```
<Bindings>
    <Binding RPN="4800 @odr /"Destination="4800OverODR" />
    <Binding Toggle="fsOrODR" Destination="fsInternal">
        <Case Value="FS" Source="fsbits"
    Destination="fsInternal" />
        <Case Value="ODR" Source="4800OverODR"
    Destination="fsInternal" />
    </Binding>
</Bindings>
```

Bundles 614 may describe groups of arguments that are to be displayed and/or solicited from the user 124 at the UI 106. Example code for describing a bundle 614 is provided below:

```
<Def Name="COMMON-BUNDLES">
    <Bundle Name="extEnabled">
        <Arg Name="resistance" />
        <Arg Name="capacitance" />
    </Bundle>
    <Bundle Name="extDisabled" />
</Def>
```

The example above indicates a bundle called extEnabled describing arguments to be received from the configuration manager 102 and/or solicited from the user 124 via the UI 106 when the bundle extEnabled is activated. For example, the arguments resistance and capacitance are to be received via the bundle extEnabled. The code above also describes a bundle extDisabled, which does not solicit or receive arguments.

Evaluation data 606 may describe a signal chain that is the subject of a simulation. A signal chain may include one or more generators (described by generator data 608), one or more simulators (described by simulator data 610), and one or more evaluations (described by evaluation data 606). A generator described by generator data 608 may generate and/or describe an input signal for simulation. Generators data 608 may include code for simulating a generator and/or a link to code for simulating a generator, a location of an executing simulation of the generator, etc. Generator data 608 and/or evaluation data may also include input parameters for a generator such as, for example, a waveform type, a frequency, etc. Example generators including single waveform generators, multiple waveform generators, etc. Simulator data 610 may describe and/or act as an interface to one or more models for simulating hardware components, such as models 112 described herein. In some examples, the configuration data 110 may include simulator data 610 for multiple components of the configurable hardware module including, for example, amplifiers, converters, filters, etc. Simulator data 610 may include code for simulating a component and/or a link to code for simulating a component, a location of an executing simulation of the component, etc. Evaluation data 606 may describe evaluations to be performed on an output of the simulated components upon receiving the input provided by the generator or generators 608, Example evaluations include, voltage plots, current plots, fast Fourier transforms or other suitable transforms, etc.

Figure 7:
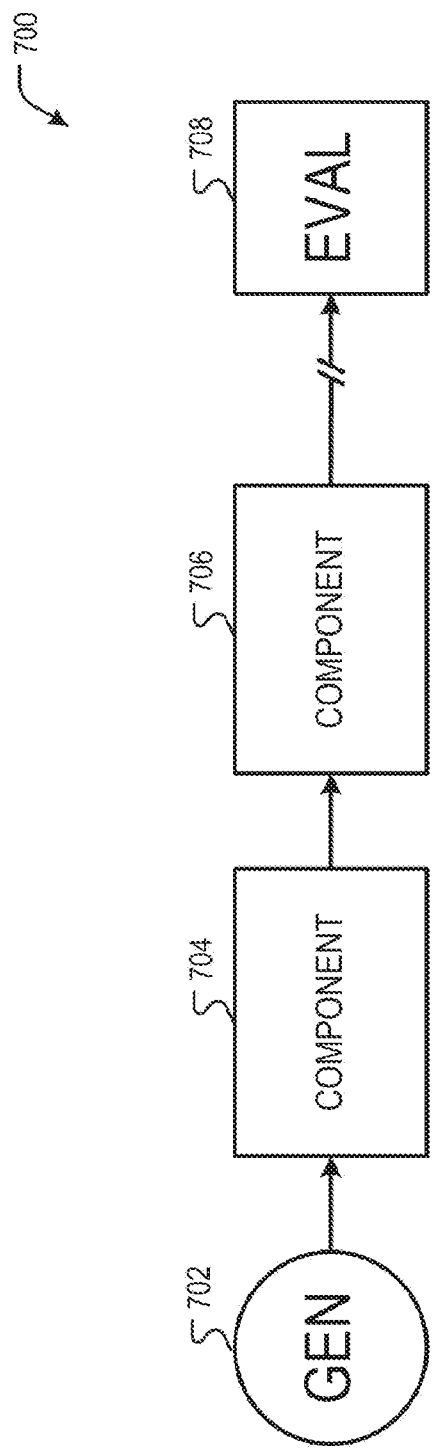
FIG. 7 is a diagram showing one example of a signal chain that may be described by configuration data for simulation by the simulation manager of FIG. 1.

FIG. 7 is a diagram showing one example of a signal chain 700 that may be described by configuration data 110 for simulation by the simulation manager 104 of FIG. 1. For example, the signal chain 700 may be described by analysis data 604 of the configuration data 110. The signal chain 700 includes a generator 702, a component 704, a component 706, and an evaluation 708. The generator 702, for example, may generate an input signal for the simulation. The generator 702 may be described by generator data 608 described above. Components 704, 706, for example, may be all or part of the hardware configuration. For example, components 704, 706 may be for example, a filter, an amplifier, a converter, etc. Simulator data 610 may describe and/or interface with a model (e.g., 112) for simulating the component 704 and/or a model for simulating the component 706. The evaluation 708 may be described by the evaluation data 606.

Figure 8:
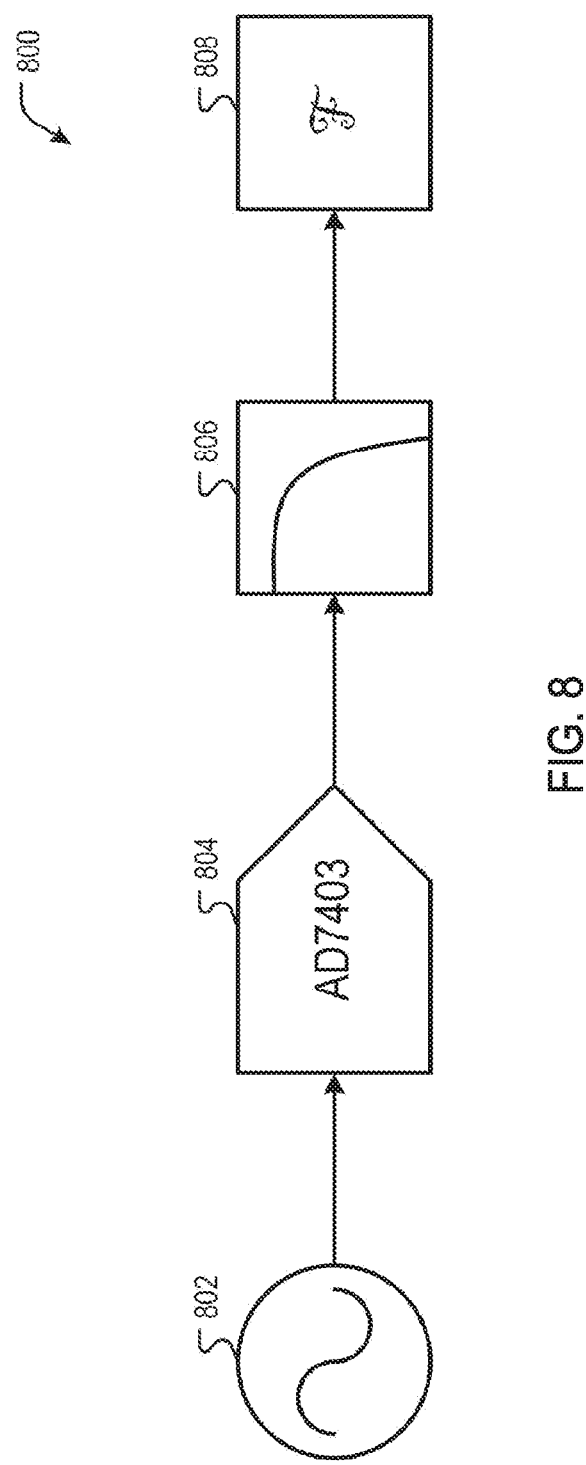
FIG. 8 is a diagram showing another example signal chain that may be described by configuration data 110 for simulation by the simulation manager of FIG. 1.

FIG. 8 is a diagram showing another example signal chain 800 that may be described by configuration data 110 for simulation by the simulation manager 104 of FIG. 1, The signal chain 800 includes a generator 802 that is configured to generate a single, sinusoidal waveform. The signal chain also includes components, a DAC 804 and a filter 806. The DAC 804 may convert a digital signal to analog. The filter 806 may be a low pass filter, for example, to remove high frequency noise. An analysis 808 is a Fourier transform to show frequency content. Any suitable Fourier transform may be used including, for example, a fast Fourier transform algorithm. The signal chain 800 may be described by configuration data HO. For example, evaluation data 606 may describe the signal chain 800 including, for example, the pieces 802, 804, 806, 808 included in the signal chain 800 and how the pieces 802, 804, 806, 808 are connected to one another. Generator data 608 may describe the generator 802 including, for example, properties and/or input parameters of the generator 802, which may be described in terms of arguments and/or bindings. Simulator data 610 may describe a model for the DAC 804 and a model for the filter 806 along with input parameters to the models, for example, in terms of arguments and/or bindings. Analysis data 604 may describe the Fourier transform analysis 808, for example, along with input parameters such as the type of Fourier transform to be used, a frequency range or frequency focus of the analysis, etc.

Figure 9:
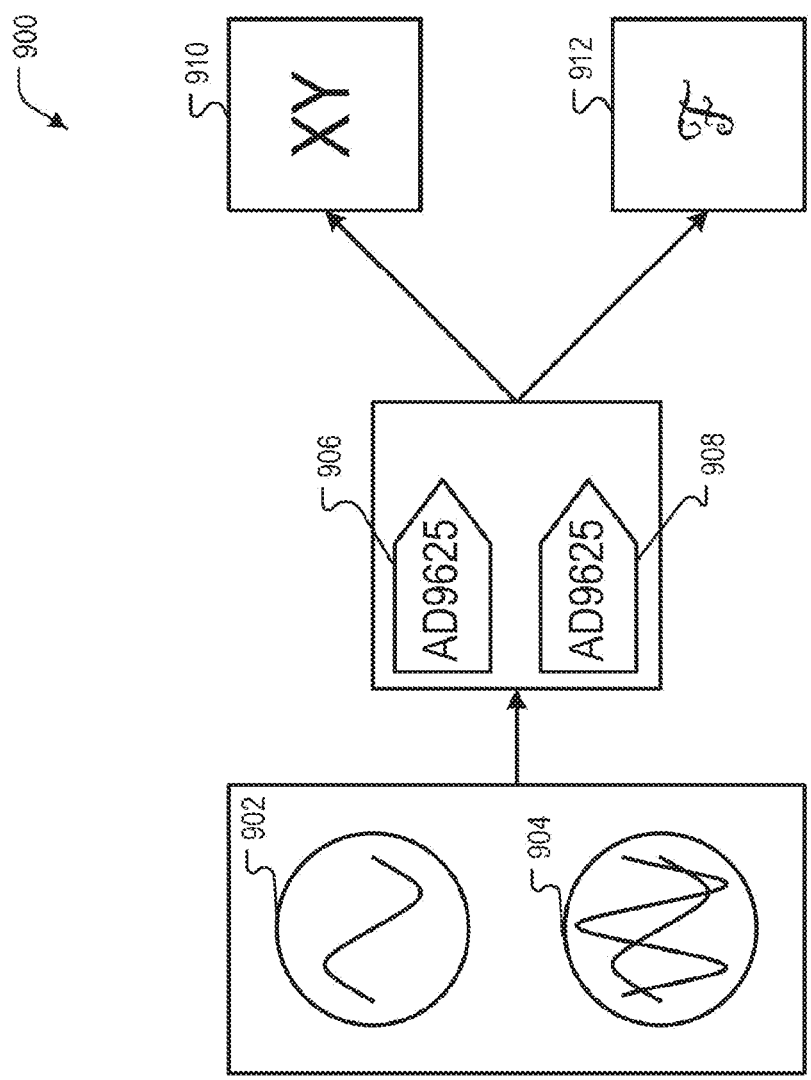
FIG. 9 is a diagram showing yet another example signal chain that may be described by configuration data for simulation by the simulation manager of FIG. 1.

FIG. 9 is a diagram showing yet another example signal chain 900 that may be described by configuration data 110 for simulation by the simulation manager 104 of FIG. 1. For example, the signal chain 900 is a compound signal chain showing multiple generators 902, 904, parallel components 906, 908, and multiple analyses 910, 912. In some examples, the simulation manager 104 may be configured to receive simulation data describing a compound signal change, such as the signal chain 900 and, in response, simulate various permutations of the signal chain 900, either serially or simultaneously. A generator 902 may be a single waveform, sinusoidal generator. Components 906, 908 may be different DACs and/or the same model DAC, but under different configurations. Analyses may include a voltage plot over time (analysis 910) and a Fourier transform (analysis 912).

Figure 10:
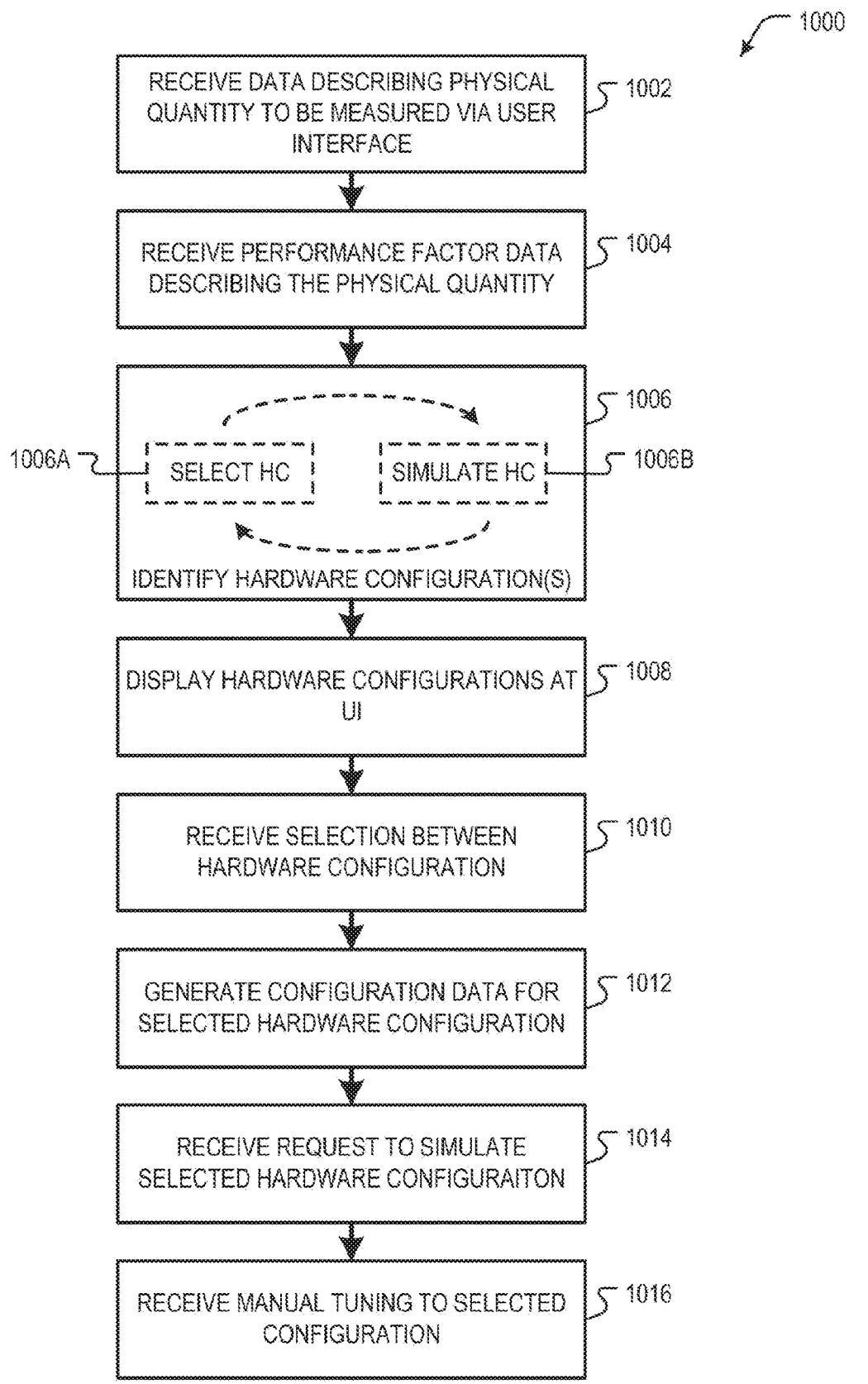
FIG. 10 is a flowchart showing one example of a process flow that may be executed in the environment of FIG. 1 to generate and simulate a hardware configuration for a configurable hardware module.

FIG. 10 is a flowchart showing one example of a process flow 1000 that may be executed in the environment 100 to generate and simulate a hardware configuration for a configurable hardware module, such as one of the configurable hardware modules 120, 420, 520. For example, the process flow 1000 describes an interaction in which a user 124 requests a hardware configuration, receives the requested hardware configuration and simulates the hardware configuration.

At operation 1002, the configuration manager 102 may receive data describing a physical quantity to be measured. The physical quantity may be any physical quantity that can be measured with a transducer or other sensor in communication with the configurable hardware module. In some examples, the data describing the physical quantity may be received via the UI 106. At operation 1004, the configuration manager 102 may receive performance factor data describing the measurement of the physical quantity. The performance factor data may describe constraints on the measurement to be made such as, for example, an expected range for the physical quantity, a desired accuracy for the measurement, a desired precision for the measurement, etc. Performance factor data may indicate a range of acceptable values for one or more performance factor. In some examples, performance factor data may also indicate a weight for one or more of the performance factors. The weight may be used by the configuration manager 102 to prioritize the performance factors when determining a hardware configuration. In some examples, the user may also provide additional design input including, for example, a type of sensor to use, a specific sensor to use, input channel parameters, excitation channel parameters, etc.

At operation 1006, the configuration manager 102 may identify one or more hardware configurations for measuring the physical quantity, for example, based at least in part on the physical quantity and a performance factor or performance factors. Any suitable method may be used to select hardware configurations. For example, the configuration manager 102 may access configuration data, such as at the configuration data store 108, describing different configurations of configurable hardware modules including, for example, performance data describing the performance of the various hardware configurations. The configuration manager 102 may select one or more hardware configurations that measure the indicated physical quantity and fit the performance factors provided by the user 124. In some examples, no hardware configurations meet all performance factors. The configuration manager 102 may select hardware configurations that are optimized based on the performance factors, for example, according to performance factor weights provided by the user 124.

Optionally, the configuration manager 102 may utilize one or more simulations to select the hardware configuration or configurations at operation 1006. For example, at optional operation 1006B, the configuration manager 102 may simulate one or more candidate hardware configuration, for example, utilizing the simulation manager 104 to execute the simulation. The configuration manager 102 may generate configuration data 110 for the selected candidate hardware configuration or configurations and provide all or part of the configuration data 110 for the candidate hardware configuration to the simulation manager 104. The simulation manager 104 may execute a simulation of the candidate hardware configuration. The simulation may return a result of the hardware configuration including, for example, a rating for the hardware configuration related to the one or more performance factors. In some examples, the configuration may simulate multiple candidate hardware configurations at operation 10061. At optional operation 1006A, the configuration manager 102 may select one or more hardware configuration from among the simulated candidate hardware configurations, for example, based on results of the simulation. In some examples, the configuration manager 102 may select one hardware configuration from among the candidate hardware configurations. For example, the configuration manager 102 may select the hardware configuration with the best match to the performance factors selected by the user 124.

In some examples, the hardware configuration generated and/or identified at operation 1006 may include instruction data for executing a dynamic measurement. A dynamic measurement may be a measurement where the operation of the configurable hardware module changes over time. For example, the configurable hardware module may change a state of the sensor (e.g., by modifying an excitation signal provided to the sensor) and/or treat an input signal from the sensor differently at different times.

For example, the configurable hardware module may change the state of a sensor by modifying an excitation signal provided to the sensor (e.g., via a configured excitation channel described herein). In some examples, the configurable hardware module may provide a stepped excitation signal that steps up, for example, by beginning at a first constant current or voltage, increasing to a second constant current or voltage, etc. In some examples, the configurable hardware module may provide a stepped excitation signal that steps down, for example, by beginning at a first constant current or voltage, decreasing to a second constant current or voltage, etc. In some examples, the configurable hardware module may provide a stepped excitation signal that steps up and down (e.g., steps up at some times and down at other times). The configurable hardware module may change the state of the sensor in any other suitable way as well, for example, by providing excitation signals that vary in other ways. For example, an excitation signal may be or include a ramp function, an exponential function, a sinusoidal or other periodic function, etc. Providing an excitation signal according to or including a function, as described, be described as providing a first excitation signal and then subsequently providing a modified excitation signal.

In some examples, the configurable hardware module may treat a sensor input signal differently over time, for example, by measuring the physical quantity after a condition is determined to be true. For example, the configurable hardware module may wait a predetermined time after the sensor is activated to measure an input signal from the sensor. For example, this may allow the sensor to settle or warm up before the physical quantity is measured. In another example, the condition may be related to an excitation signal. For example, if the excitation signal is to ramp up to a particular current or voltage, the configurable hardware module may wait until the excitation signal has completed it ramping before measuring the input signal from the sensor.

At operation 1008, the configuration manager 102 may display at the UI 106 the one or more candidate hardware configurations generated at operation 1006. The configuration manager 102 may also display values of the performance factors for the respective candidate hardware configurations. In some examples, the UI 106 may also provide textual descriptions of the candidate hardware configurations including, for example, descriptions of the advantages and/or disadvantages of each. At operation 1010, the configuration manager 102 may receive from the user 124 a selection of one of the candidate hardware configurations displayed at the UI 106. For example, the user 124 may select a hardware configuration at the UI 106. In some examples, the user 124 may also select additional implementation details of the hardware configuration as well, for example, as described below at FIG. 14.

In some examples, the configuration manager 102 may select a single hardware configuration from among the candidate hardware configurations. For example, the configuration manager 102 may select the candidate hardware configuration that best matches the performance factors (e.g., and weights for the performance factors). When the configuration manage 102 selects a single hardware configuration, data describing that hardware configuration may be displayed at the UI at operation 1008 and the user may confirm the selected hardware configuration at operation 1010.

At operation 1012, the configuration manager 102 may generate configuration data 110 for the selected hardware configuration. If the selected hardware configuration as previously simulated at operation 1006B, configuration data 110 for the selected hardware configuration may already exists. In some examples, simulation data generated for operation 1006B may be supplemented at operation 1012 with hardware configuration data, such as register map settings or other switch state data, instructions for execution at a control circuit, etc.

At operation 1014, the configuration manager 102 and/or simulation manager 104 may allow the user 124 to simulate the selected hardware configuration, for example, via the UI 106. For example, referring to FIG. 2, the simulation manager 104 may provide a simulation UI 206 either separately or via the UI 106. In some examples, the user 124 may modify the hardware configuration based on results of the simulation. For example, the configuration manager 102 may receive, through the UI 106, a request from the user to modify the hardware configuration at operation 1016. In response, the configuration manager 102 may modify the configuration data 110 for the selected hardware configuration.

Figure 11:
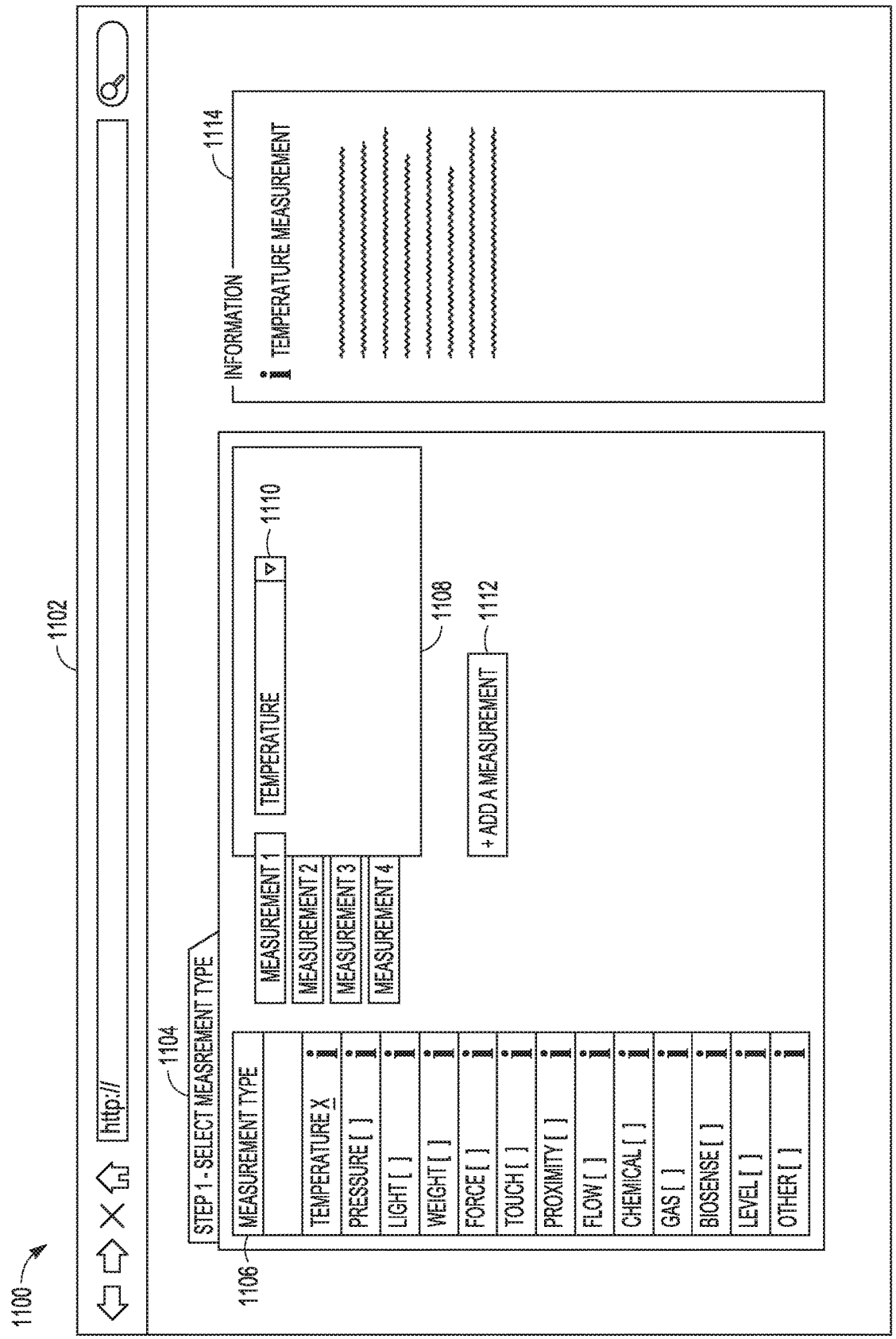
FIG. 11 is screen shot showing a screen of the user interface of FIG. 1 for receiving data describing a physical quantity to be measured.

FIGS. 11-21 show example screen shots from the UI 106 that demonstrate an example implementation of the process flow 1000. FIG. 11 is screen shot showing a screen 1100 of the 106 for receiving data describing a physical quantity to be measured. The screen 1100 is shown in a web browser 1102. For example, the UI 106 may be provided by a web app executed at the user computing device 122. The screen 1100 includes a Select Measurement Type tab 1104, which is displayed in the screen 1100. The Select Measurement Type tab 1104 may comprise a Measurement Type field 1106. The user may select a physical quantity to be measured from the Measurement Type field 1106. In the example of FIG. 11, the Measurement Type field 1106 includes example physical quantities including, temperature, pressure, light, weight, force, touch, proximity, flow, chemical quantities, gas, biosense or biometric quantities, level, etc. This listing is non-limiting and additional physical quantities may also be available for selection in some examples in addition to or instead of some or all of the physical quantities shown in FIG. 11.

In some examples, when the user 124 selects a physical quantity from the Measurement Type field 1106, additional information about the physical quantity and/or information about measuring the physical quantity may be displayed at an information field 1114. This may educate the user 124 during the process of selecting a hardware configuration.

A measurement field 1108 may display physical quantities selected by the user 124 (e.g., from the Measurement Type field 1106). For example, the user 124 may select an add measurement button 1112 to cause a measurement to display at the measurement field 1108. The user may select an added measurement, for example, by selecting a corresponding tab at the measurement field 1108. For example, in FIG. 11, a tab Measurement 1 for a first measurement is selected. When a measurement tab is selected, the user 124 may provide a physical quantity for the measurement, for example, utilizing menu 1110. Any suitable menu type may be used.

Figure 12:
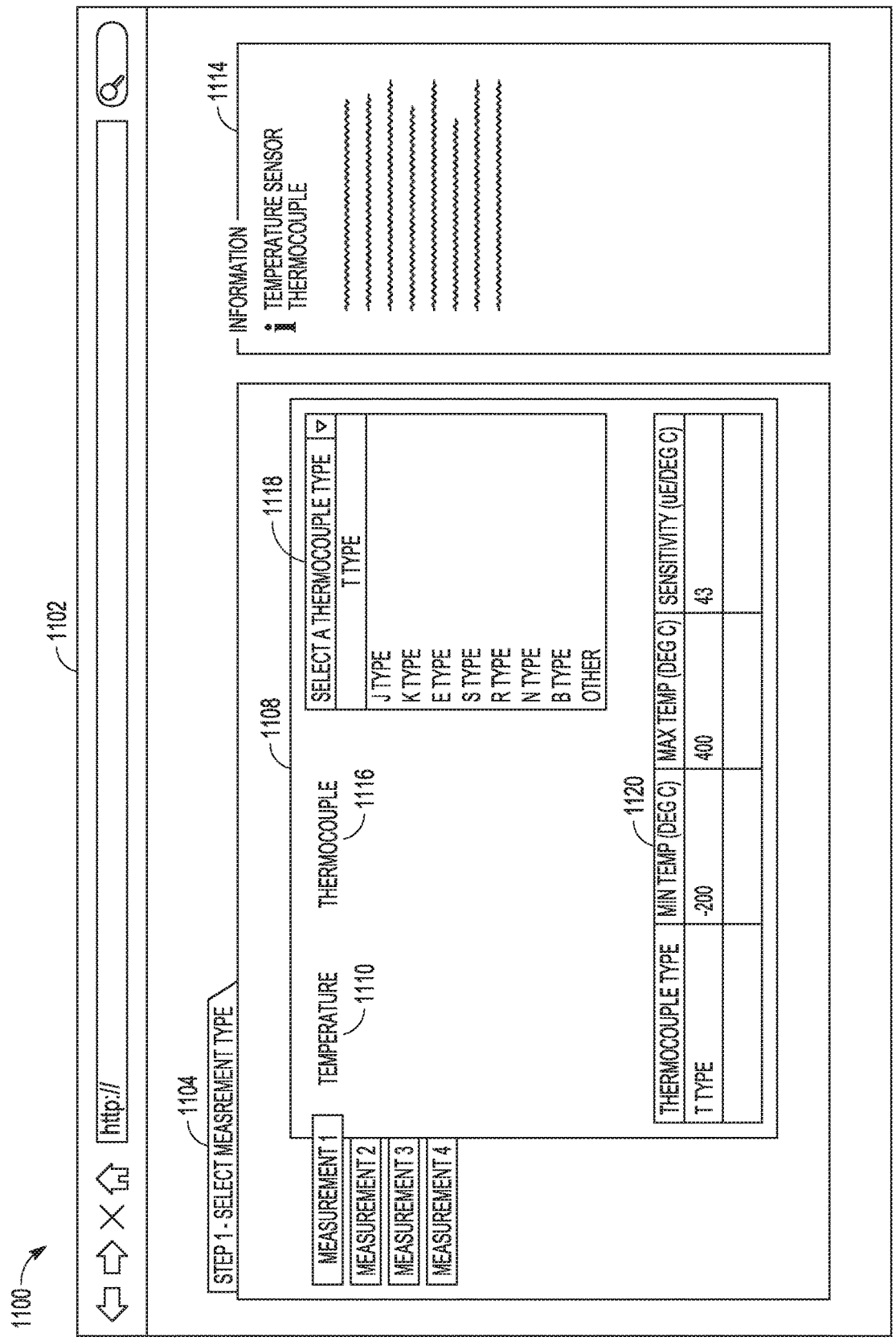
FIG. 12 is a screen shot of FIG. 11 showing another example view of the screen of FIG. 11 including a more detailed view of the measurement field for receiving additional design input from the user.

FIG. 11 shows multiple measurements at the measurement field 1108. In some examples, the configuration manager 102 may be configured to select a hardware configuration for the configurable hardware module that is capable of managing multiple physical quantities simultaneously. For example, the configurable hardware module (such as 120, 420, 520) may comprise components to generate multiple input and excitation channels to drive multiple sensors. In other examples, the UI 106 and configuration manager 102 may allow the user 124 to generate multiple hardware configurations. For example, each tab at the measurement field 1108 (e.g., Measurement 1, Measurement 2, Measurement 3, Measurement 4, etc.) may correspond to a different hardware configuration generated by the configuration manager, FIG. 12 is a screen shot showing another example view of the screen 1100 including a more detailed view of the measurement field 1108 for receiving additional design input from the user. In FIG. 12, the Select Measurement Type tab 1104 is selected, as in FIG. 11. The Measurement 1 tab of the measurement field 1108 is also still selected. The user 124 has selected "Temperature" as the physical quantity to be measured, as indicated at menu 1110. A sensor class menu 1116 shows that the sensor class "Thermocouple" has been selected. If only one class of sensor is available to measure a particular physical quantity, then the configuration manager 102 may select that class and populate the sensor class menu 1116 accordingly. In some examples where multiple sensor classes are available, the user 124 may select a sensor class from the sensor class menu 1116. In some examples, the information field 1114 may be updated to display information about sensor classes including, for example, the selected sensor class.

A sensor type field 1118 may allow the user 124 to select the type of sensor to be used. A sensor type data field 1120 may provide data about the selected sensor type and/or other sensor type. For example, in FIG. 12, the sensor type data field 1120 shows performance parameters of a T Type Thermocouple sensor including, for example, a minimum temperature that can be measured, a maximum temperature that can be measured, and a sensitivity.

Figure 13:
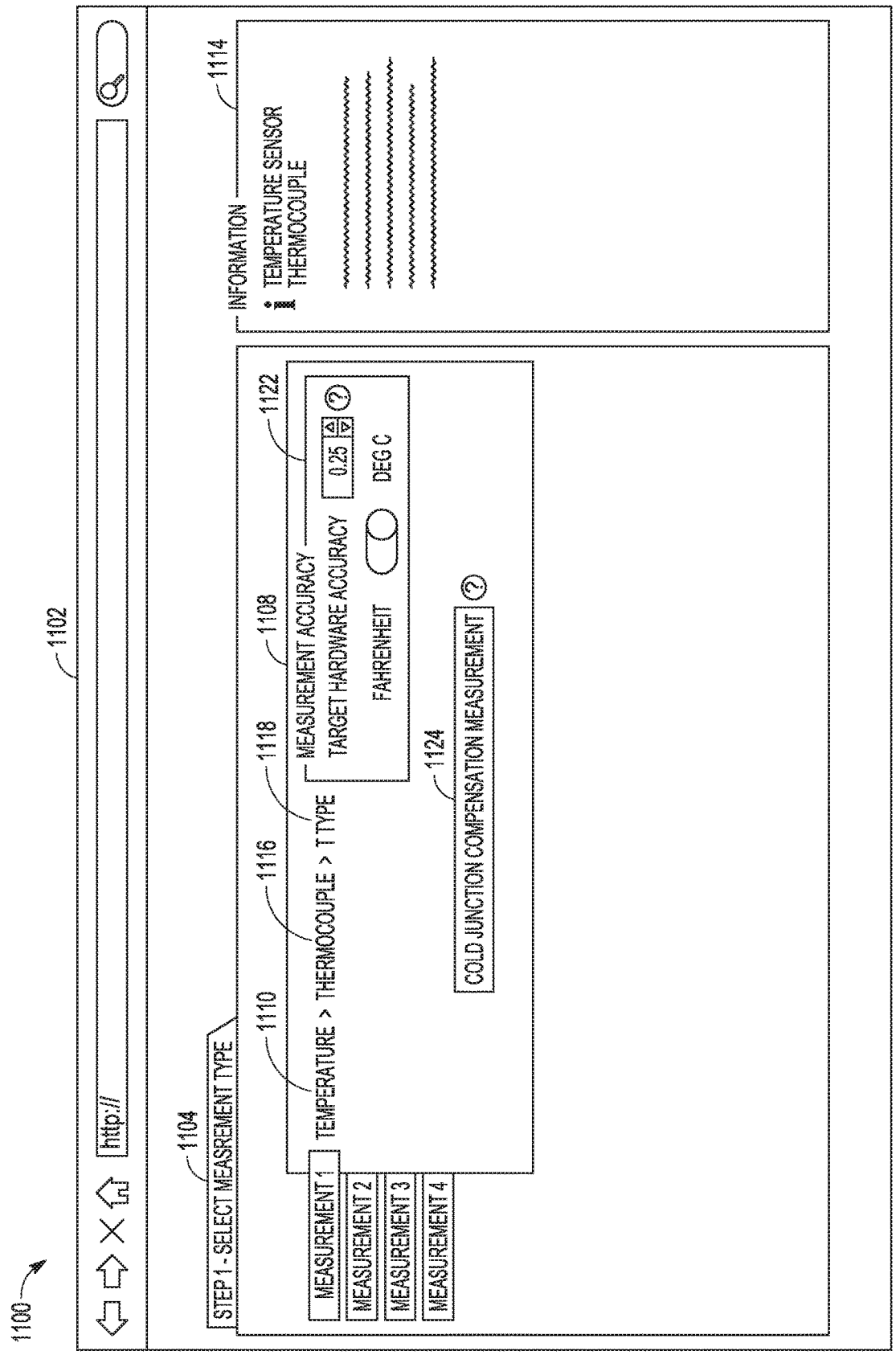
FIG. 13 is a screen shot showing another example view of the screen of FIG. 11 including a view of the measurement field for receiving performance factor data and additional design input from the user.

FIG. 13 is a screen shot showing another example view of the screen 1100 including a view of the measurement field 1108 for receiving performance factor data and additional design input from the user 124. In FIG. 13, the Select Measurement Type tab 1104 is selected, as in FIGS. 11 and 12. The Measurement 1 tab of the measurement field 1108 is also still selected. The user 124 has selected "Temperature" as the physical quantity to be measured, as indicated at menu 1110. The sensor class menu 1116 shows that the sensor class "Thermocouple" has been selected, and the sensor type menu 1118 shows that the sensor type "T-Type" has been selected. A Measurement Accuracy field 1122 may receive values for a performance factor describing the desired accuracy of the temperature measurement. For example, in FIG. 13, the user has selected a desired accuracy of 0.25 degrees Centigrade.

A hardware configuration type button 1124 shows a type of hardware configuration that may meet the performance factor entered at field 1122. For example, in FIG. 13, one hardware configuration meets the indicated performance factor, a Cold Junction Compensation Measurement configuration. If multiple types of hardware configurations could meet the performance factor, multiple examples of the button 1124 may be shown. In some examples, the user 124 selects a hardware configuration type by selecting the corresponding button (e.g., button 1124 or another button if additional buttons are shown). The information field 1114 may be updated to include descriptions of the selected sensor class, type, and hardware configuration type.

Figure 14:
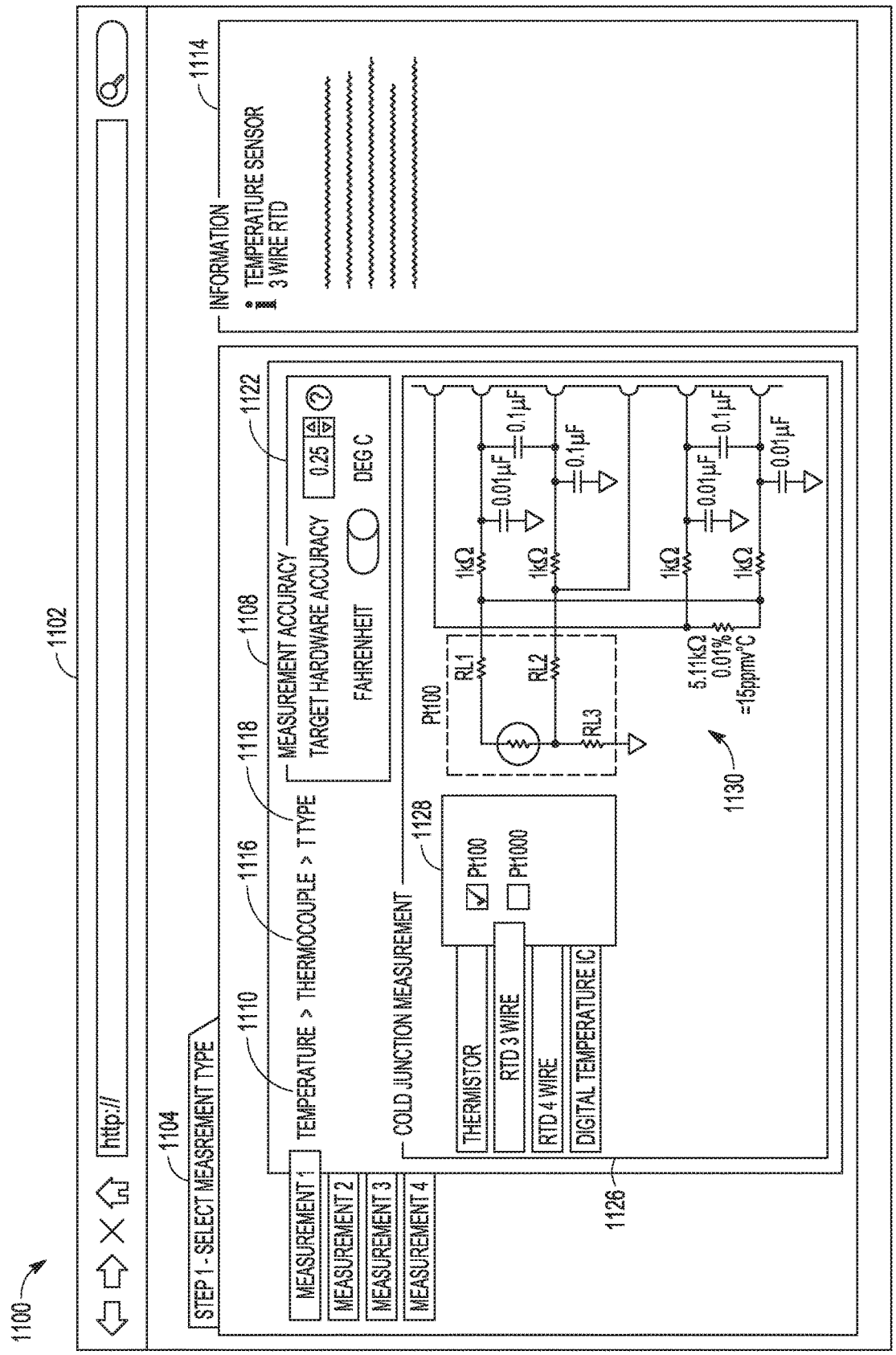
FIG. 14 is a screen shot showing another example view of the screen of FIG. 11 including a view of the measurement field for receiving for receiving additional design input from the user.

FIG. 14 is a screen shot showing another example view of the screen 1100 including a view of the measurement field 1108 for receiving additional design input from the user 124. As shown in FIG. 14, the user 124 has selected a Cold Junction Compensation Measurement hardware configuration. A hardware configuration detail field 1126 may receive additional details of the selected hardware configuration type. For example, the configuration field 1126 may include a sensor field 1128 allowing the user to select a specific sensor to be used with the hardware configuration. The sensor field 1128 may include tabs describing categories of sensors. For example, in FIG. 14, the sensor field 1128 includes tabs for Thermistor category sensors, RTD 3 wire category sensors, RTD 4 wire category sensors, and Digital Temperature IC category sensors. In FIG. 14, the RTD 3 wire category sensor is selected and two specific sensors are displayed at the sensor field 1128, for example, by serial number (e.g., Pt100 and Pt1000). The user may select one of the sensors from the sensor field 1128. The configuration detail field 1126 may also display a schematic diagram 1130 of the hardware configuration. Also, in some examples, the information field 1114 may be updated to describe the selected sensor, sensory category, sensor class, etc.

Figure 15:
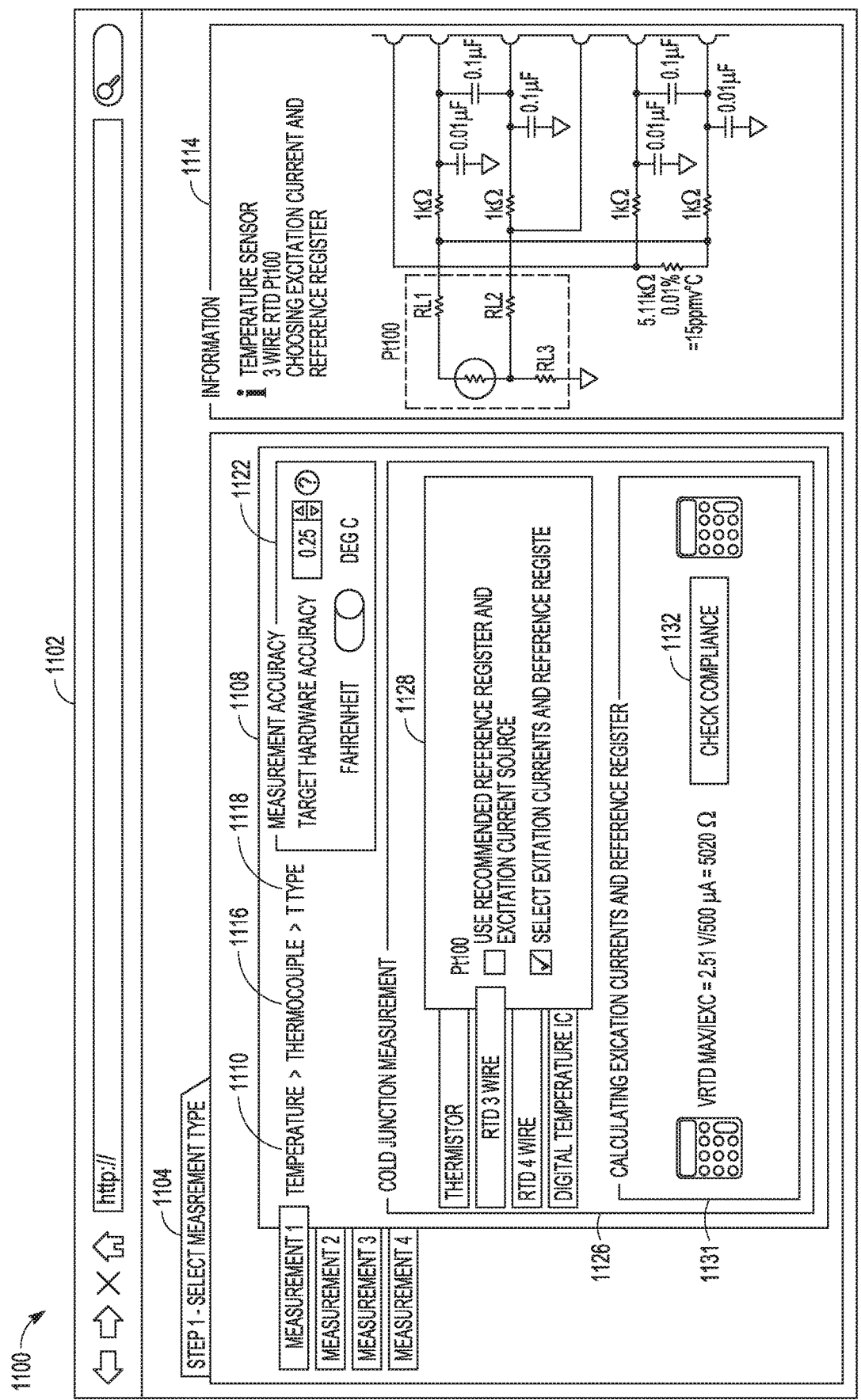
FIG. 15 is screen shot showing another example view of the screen of FIG. 11 including a view of the configuration detail field for receiving for receiving additional design input from the user.

FIG. 15 is screen shot showing another example view of the screen 1100 including a view of the configuration detail field for receiving additional design input from the user 124. In FIG. 15, the user 124 has selected a sensor (e.g., Pt100). The sensor field 1128, upon selection of Pt100, may include a prompt asking the user 124 whether to utilize a recommended input channel and excitation channel parameters or to select input channel and excitation channel parameters manually. For example, the sensor selected in the example of FIG. 15 is a force current, measure current (FIMI) sensor, so the excitation channel parameter shown is an excitation current and the input channel parameter shown is a reference resistor value. Different types of sensors will have different excitation and input channel parameters.

Figure 16:
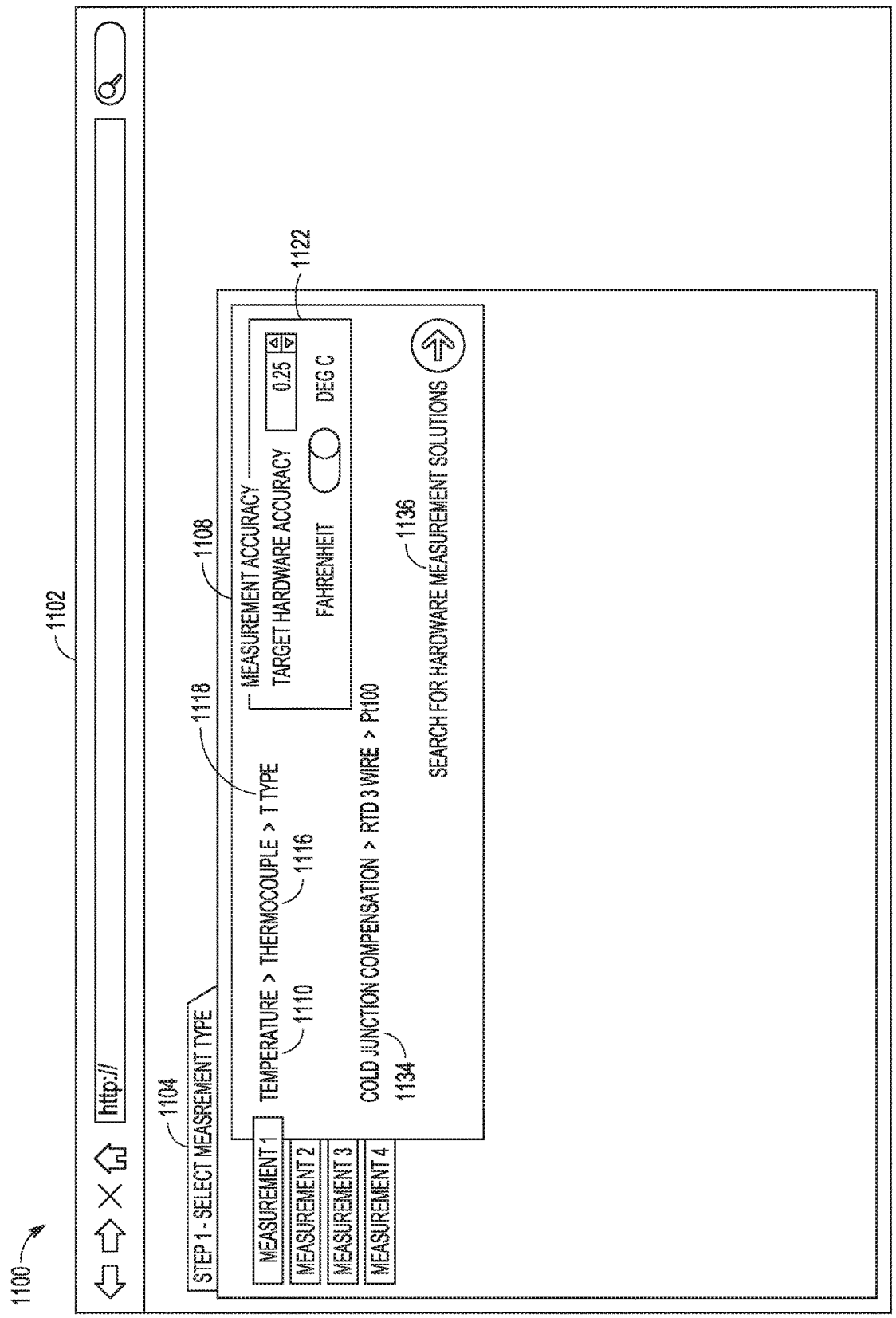
FIG. 16 is a screen shot showing another example view of the screen of FIG. 11.

If the user 124 is to manually select the input channel and excitation channel parameters, as selected in FIG. 15, the configuration detail field 1126 may include a manual parameter field 1131 for receiving input channel and/or excitation channel parameters. If the user 124 selects a Check Compliance button 1132, the configuration manager may determine whether the hardware configuration, with the user's selected input channel and excitation channel parameters, meets the performance factors. The information field 1114, may be again updated to indicate additional information about input channel and/or excitation channel configuration. FIG. 16 is a screen shot showing another example view of the screen 1100. In FIG. 16, the user has provided additional design input, as described. Some or all of the additional design input may be summarized at a design input summary field 1134. The user may select a search button 1136 to prompt the configuration manager 102 to select hardware configurations.

Figure 17:
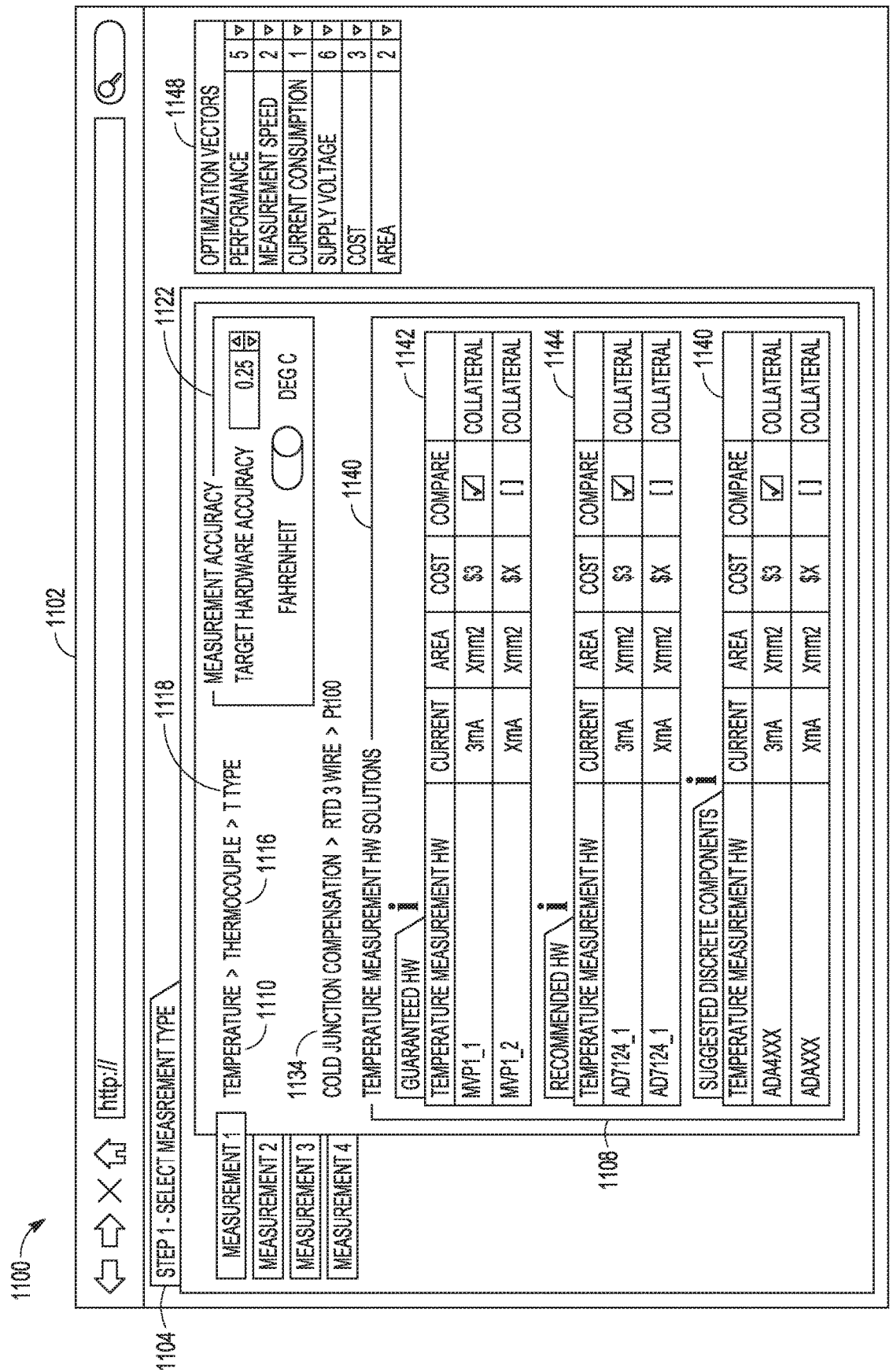
FIG. 17 is a screen shot showing another example view of the screen of FIG. 11 displaying candidate hardware configurations at the measurement field.

FIG. 17 is a screen shot showing another example view of the screen 1100 displaying candidate hardware configurations at the measurement field 1108. For example, a candidate hardware configuration field 1140 may display information describing candidate hardware configurations generated by the configuration manager 102, for example, when the user 124 selects the search button 1136 (FIG. 16). For example, candidate hardware configuration fields 1142, 1144, 1146 may describe, respectively, three different candidate hardware configurations. In some examples, the candidate hardware configurations at fields 1142, 1144, 1146 may be positioned in an order indicating how well the hardware configurations match the performance factors provided by the user 124. For example, the candidate hardware configuration described at field 1142 may be the best match to the performance factors, while hardware configurations described at fields 1144 and 1146 may be lesser matches.

FIG. 17 also shows an example performance factor weight field 1148 including various performance factors and corresponding weight menus. The user 124 may assign weights to the listed performance factors and the configuration manager 102 may determine and/or rank the candidate hardware configurations based on the weights entered. For example, the order of candidate hardware configurations shown at fields 1142, 1144, 1146 may reflect the performance factor weights provided at the performance factor weight field 1148. The user 124 may select a candidate hardware configuration, for example, from the candidate hardware configuration field 1140.

Figure 18:
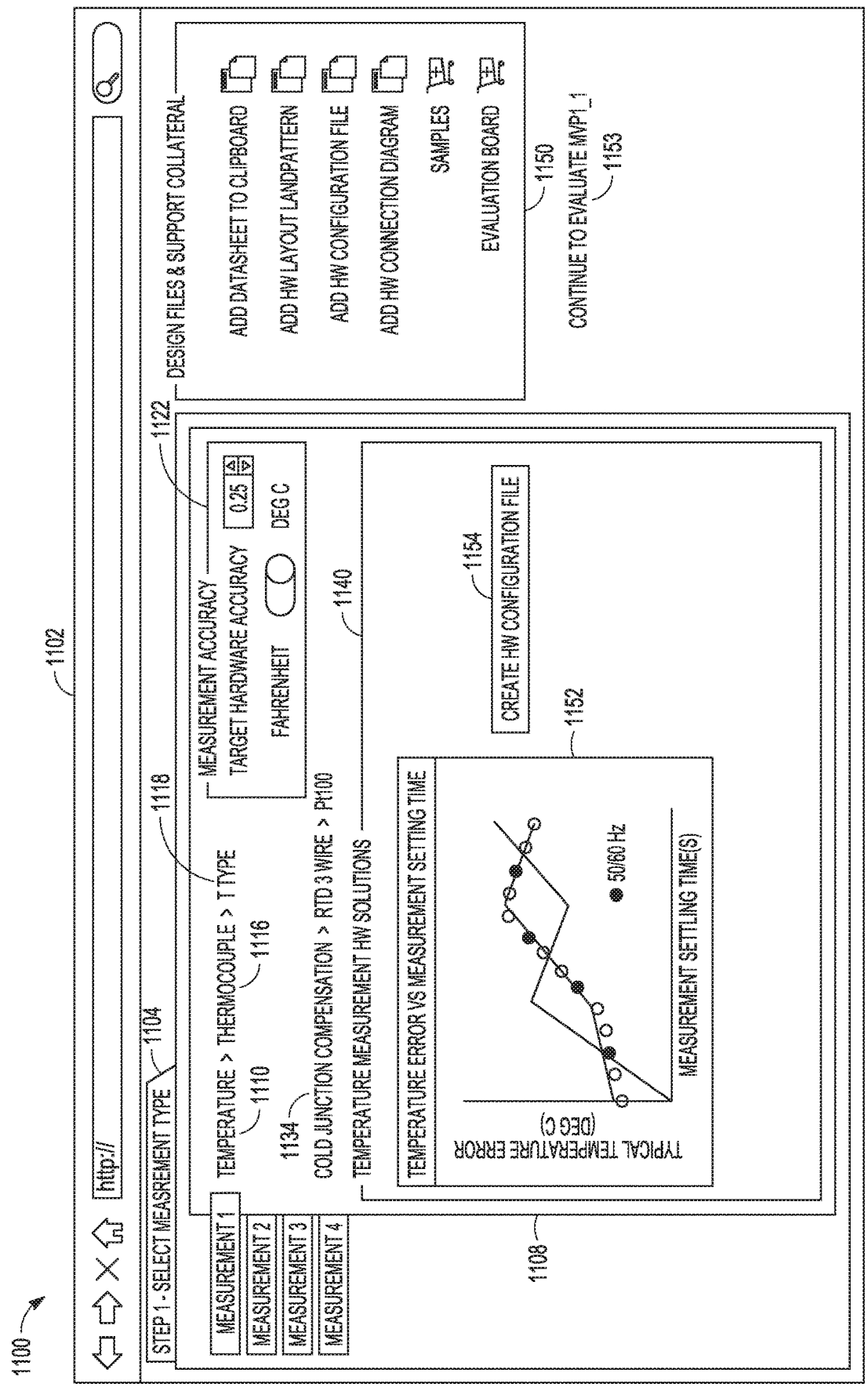
FIG. 18 is a screen shot showing another example view of the screen of FIG. 11 displaying additional information describing a selected hardware configuration.

When the user selects a candidate hardware configuration, in some examples, the configuration manager 102 may provide the user with additional information describing a selected hardware configuration and/or with options for proceeding. FIG. 18 is a screen shot showing another example view of the screen 1100 displaying additional information describing a selected hardware configuration. For example, in FIG. 18, the hardware configuration field 1140 includes a performance graph 1152 including data describing the selected hardware configuration. In the example of FIG. 18, the performance graph 1152 shows an indication of a measurement error (vertical axis) over a measurement settling time (horizontal axis). For example, the measurement settling time may indicate a time since the sensor was activated (e.g., bias signal provided). In some examples, the hardware configuration may include instructions for measuring the input signal from the sensor at a measurement settling time provides an acceptable error level. For example, the passing of the determined measurement settling time may be a condition, after which the input signal is measured.

A Create HW Configuration File button 1154 may be selected by the user 124 to prompt the configuration manager to generate and/or complete configuration data 110 for the selected hardware configuration. For example, when the user selects the button 1154, the configuration manager 102 may generate hardware configuration data such as, for example, a register map or other switch setup for the hardware configuration, instructions to be executed by a control circuit of the configurable hardware module, etc.

A field 1150 may include buttons for allowing the user 124 to request additional services from the configuration manager 102. For example, an Add Datasheet to Clipboard button, when selected, may prompt the configuration manager 102 to retrieve datasheets for the sensor and/or other components of the configurable hardware module and provide the same to the user and/or append the data sheets to the configuration data 110. An Add HW Layout Landpattern button, when selected, may prompt the configuration manager 102 to provide a hardware layout land pattern, for example, via the UI 106 and/or appended to the configuration data 110. An Add HW Configuration File button may prompt the configuration manager 102 to provide a hardware configuration file for example, including or describing the hardware configuration data, for example, via the UI 106 and/or appended to the configuration data 110. An Add HW Connection Diagram button may prompt the configuration manager 102 to provide a hardware connection diagram for the hardware configuration, for example, via the UI 106 and/or appended to the configuration data 110. A Samples button, when selected by the user 124, may direct the user 124, for example, to a web location where the user 124 may purchase or otherwise order samples of hardware components utilized by the hardware configuration. An Evaluation Board button, when selected by the user 124, may direct the user 124, for example, to a web location where the user 124 may purchase or otherwise obtain an evaluation board for implementing the hardware configuration.

Figure 19:
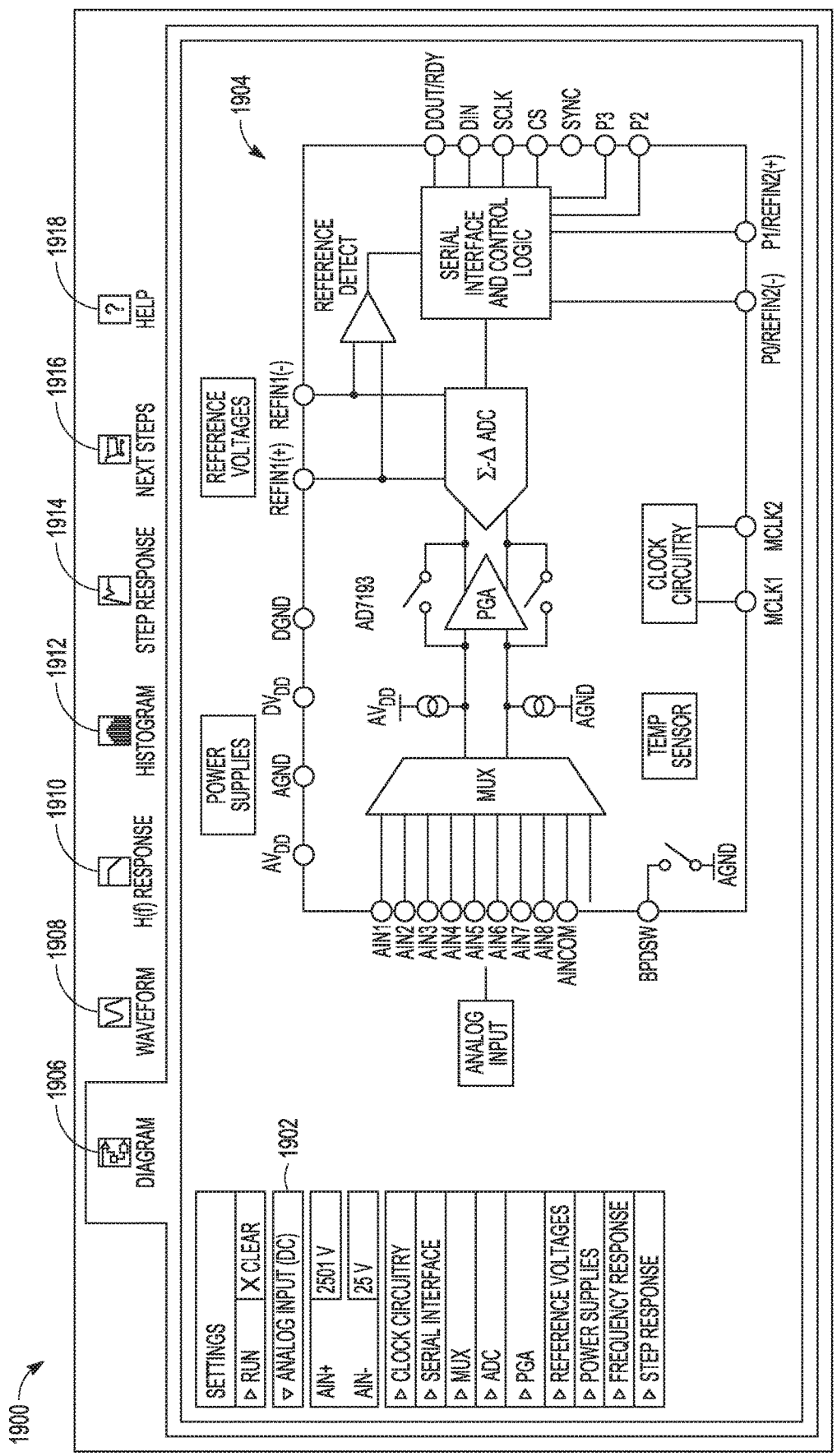
FIG. 19 is a screen shot showing an example simulation screen.

In some examples, a Continue to Evaluate button 1153, when selected by the user 124, may prompt the configuration manager 102 and/or the simulation manager 104 to simulate the selected hardware configuration. FIG. 19 is a screen shot showing an example simulation screen 1900. The simulation screen 1900 may be provided to the user 124 via the UI 106. The screen 1900 comprises a settings field 1902 and a schematic field 1904. The settings field 1902 may indicating input parameters for a simulation of the selected hardware configuration. For example, values of the input parameters may be read from the configuration data 110. In some examples, the user 124 may modify values of some or all of the input parameters at the field 1902. In some examples, input parameters from the settings field 1902 may correspond to arguments described by argument data 616 at the configuration data 110. For example, the configuration data may include bundle data 614 describing the combination of input parameters/arguments shown at the field 1902.

Tabs 1906, 1908, 1910, 1912, 1914, 1916, 1918 may be selected by the user to display different aspects of a simulation at the screen 1900. For example, in FIG. 19, Diagram tab 1906 is selecting, which may prompt the simulation manager 104 to display a schematic field 1904 showing a schematic diagram of the hardware configuration. In the example of FIG. 19, input parameters or arguments describing a generator for the simulation are indicated by the Analog Input block at the schematic field 1904 and by the Analog Input (DC) field at the settings field 1902. Simulators and underlying models 112 for the various components may be read from the configuration data 110 (e.g., simulator data 610).

Figure 20:
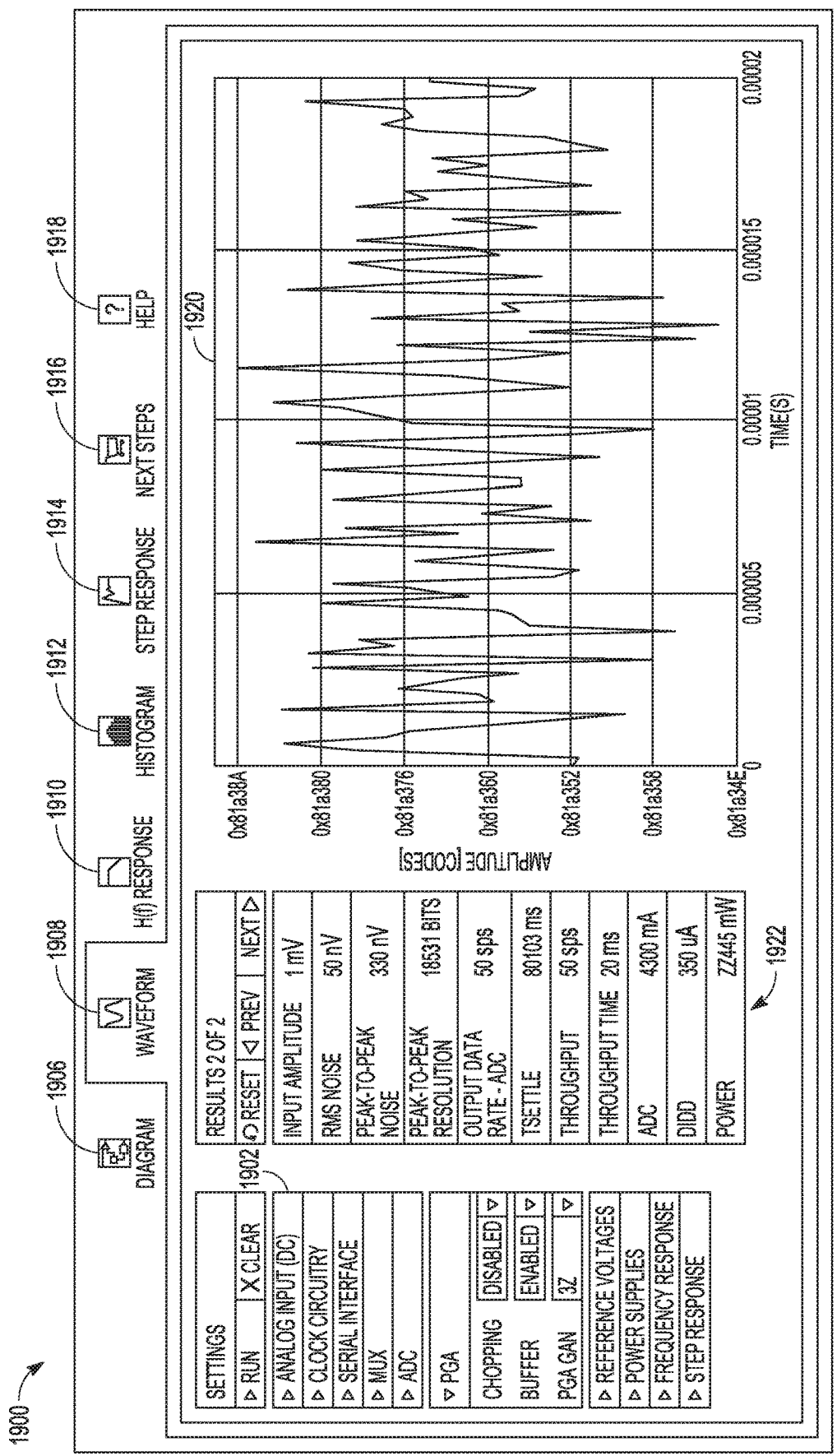
FIG. 20 is a screen shot showing another example of the screen of FIG. 19 with a waveform evaluation tab selected to view results of a waveform evaluation.
Figure 21:
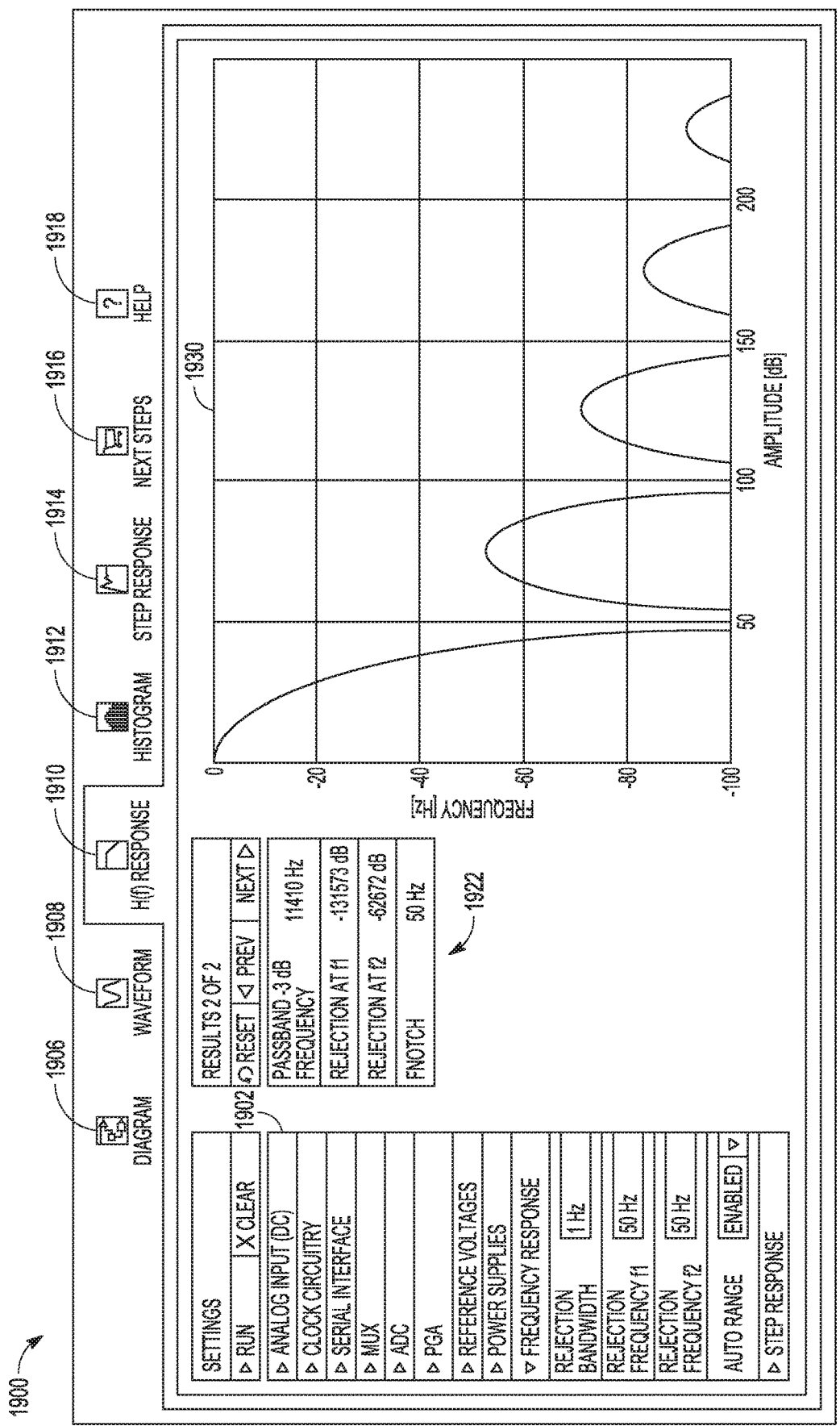
FIG. 21 is a screen shot showing another example of the screen of FIG. 19 with a frequency response tab selected.

Tabs 1908, 1910, 1912, and 1914 represent evaluations performed by the simulation manager 104. For example, FIG. 20 is a screen shot showing another example of the screen 1900 with a Waveform evaluation tab selected to view results of a waveform evaluation. For example, a graph field 1920 shows a graphical plot of a waveform resulting from the simulation of the hardware configuration. A result table field 1922 shows numerical values for various characteristics of the waveform shown at the graph field 1904. FIG. 21 is a screen shot showing another example of the screen 1900 with a frequency response tab 1910 selected. A graph field 1930 shows a graphical representation of the frequency response of the hardware configuration to the generator. A result table field 1932 shows numerical values describing the frequency response shown at the graph field 1930. Additional tabs 1912, 1914 may cause the screen 1900 to show additional evaluation results. For example, a histogram tab 1912, when selected, may show a histogram of a particular property of the hardware configuration (e.g., noise level, output voltage) over executed trials of a model. A step response tab, 1914, when selected, may show a response of the hardware configuration to a step function.

A next steps tab 1916 may link to a web location, for example, where the user 124 may order the configurable hardware module, sensors, and/or other components for implementing the hardware configurations. A Help tab 1918 may launch a help function of the simulation manager 104.

Figure 22:
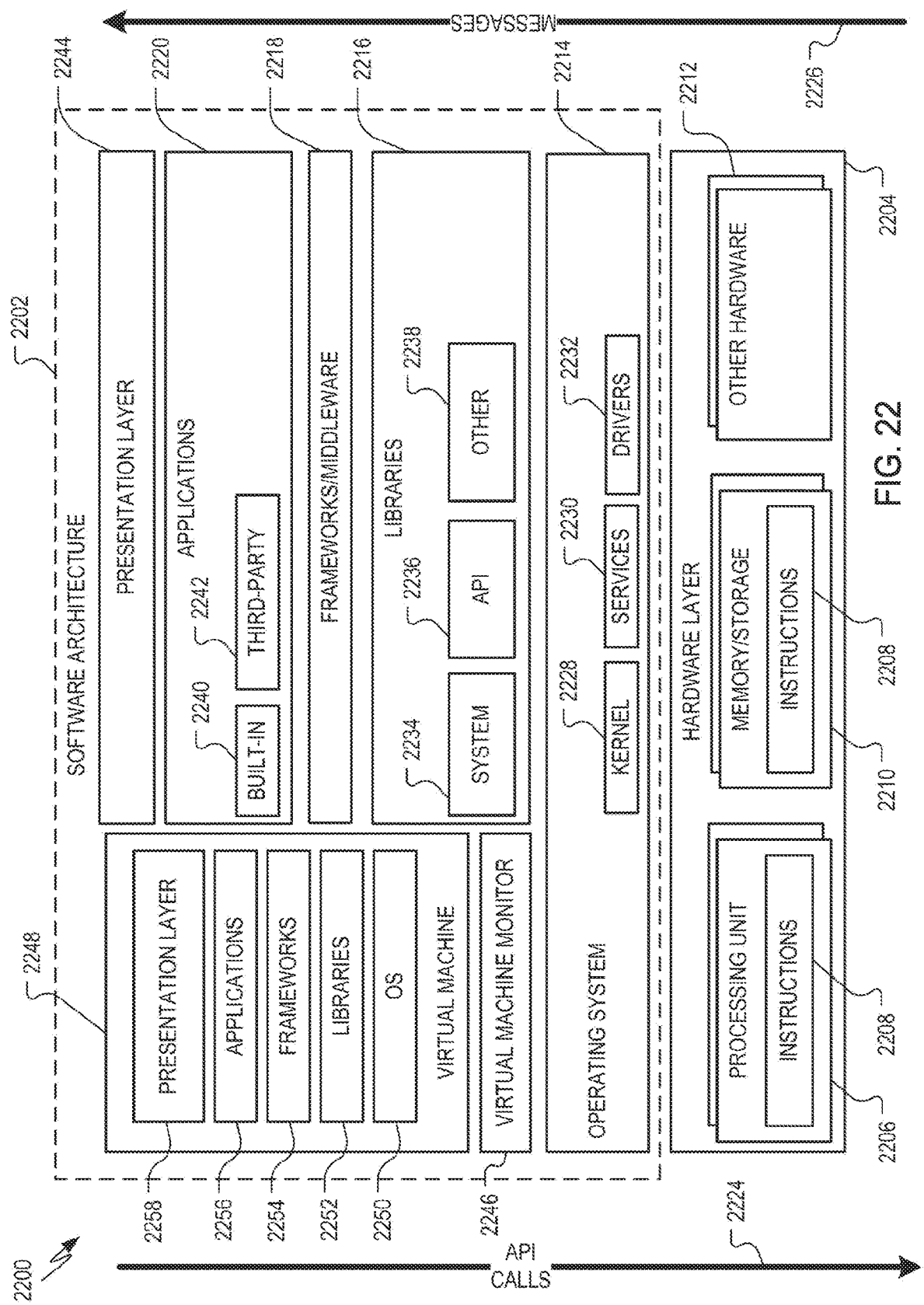
FIG. 22 is a block diagram showing one example of a software architecture for a computing device.

FIG. 22 is a block diagram 2200 showing one example of a software architecture 2202 for a computing device. The architecture 2202 maybe used in conjunction with various hardware architectures such as, for example, the control circuits 314, 404, 504, the user computing device 122, the server 126 or servers implementing the configuration manager 102 and simulation manager 104, etc., for example, as described herein. FIG. 22 is merely a non-limiting example of a software architecture 2202 and many other architectures may be implemented to facilitate the functionality described herein. A representative hardware layer 2204 is illustrated and can represent, for example, any of the above referenced computing devices. In some examples, the hardware layer 2204 may be implemented according to the architecture 2202 of FIG. 22 and/or the architecture 2300 of FIG. 23.

The representative hardware layer 2204 comprises one or more processor units 2206 having associated executable instructions 2208. Executable instructions 2208 represent the executable instructions of the software architecture 2202, including implementation of the methods, modules, components, and so forth of FIGS. 1-21. Hardware layer 2204 also includes memory and/or storage modules 2210, which also have executable instructions 2208. Hardware layer 2204 may also comprise other hardware as indicated by other hardware 2212, which represents any other hardware of the hardware layer 2204, such as the other hardware illustrated as part of hardware architecture 2300.

In the example architecture of FIG. 22, the software 2202 may be conceptualized as a stack of layers where each layer provides particular functionality. For example, the software 2202 may include layers such as an operating system 2214, libraries 2216, frameworks/middleware 2218, applications 2220 and presentation layer 2244. Operationally, the applications 2220 and/or other components within the layers may invoke application programming interface (API) calls 2224 through the software stack and receive a response, returned values, and so forth illustrated as messages 2226 in response to the API calls 2224. The layers illustrated are representative in nature and not all software architectures have all layers. For example, some mobile or special purpose operating systems may not provide a frameworks/middleware layer 2218, while others may provide such a layer. Other software architectures may include additional or different layers.

The operating system 2214 may manage hardware resources and provide common services. The operating system 2214 may include, for example, a kernel 2228, services 2230, and drivers 2232. The kernel 2228 may act as an abstraction layer between the hardware and the other software layers. For example, the kernel 2228 may be responsible for memory management, processor management (e.g., scheduling), component management, networking, security settings, and so on. The services 2230 may provide other common services for the other software layers. In some examples, the services 2230 include an interrupt service. The interrupt service may detect the receipt of a hardware or software interrupt and, in response, cause the architecture 2202 to pause its current processing and execute an interrupt service routine (ISR) when an interrupt is received. The ISR may generate the alert, for example, as described herein.

The drivers 2232 may be responsible for controlling or interfacing with the underlying hardware. For instance, the drivers 2232 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 2216 may provide a common infrastructure that may be utilized by the applications 2220 and/or other components and/or layers. The libraries 2216 typically provide functionality that allows other software modules to perform tasks in an easier fashion than to interface directly with the underlying operating system 2214 functionality (e.g., kernel 2228, services 2230 and/or drivers 2232). The libraries 2216 may include system libraries 2234 (e.g., C standard library) that may provide functions such as memory allocation functions, string manipulation functions, mathematic functions, and the like. In addition, the libraries 2216 may include API libraries 2236 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions web libraries (e.g., WebKit that may provide web browsing functionality), and the like. The libraries 2216 may also include a wide variety of other libraries 2238 to provide many other APIs to the applications 2220 and other software components/modules.

The frameworks 2218 (also sometimes referred to as middleware) may provide a higher-level common infrastructure that may be utilized by the applications 2220 and/or other software components/modules. For example, the frameworks 2218 may provide various graphic user interface (GUI) functions, high-level resource management, high-level location services, and so forth. The frameworks 2218 may provide a broad spectrum of other APIs that may be utilized by the applications 2220 and/or other software components/modules, some of which may be specific to a particular operating system or platform.

The applications 2220 include built-in applications 2240 and/or third-party applications 2242. Examples of representative built-in applications 2240 may include, but are not limited to, a contacts application, a browser application, a book reader application, a location application, a media application, a messaging application, and/or a game application. Third-party applications 2242 may include any of the built-in applications 2240 as well as a broad assortment of other applications. In a specific example, the third-party application 2242 (e.g., an application developed using the Android™ or iOS™ software development kit (SDK) by an entity other than the vendor of the particular platform) may be mobile software running on a mobile operating system such as iOS™, Android™, Windows® Phone, or other user computing device operating systems. In this example, the third-party application 2242 may invoke the API calls 2224 provided by the mobile operating system such as operating system 2214 to facilitate functionality described herein.

The applications 2220 may utilize built-in operating system functions (e.g., kernel 2228, services 2230 and/or drivers 2232), libraries system 2234, APIs 2236, and other libraries 2238), frameworks/middleware 2218 to create user interfaces to interact with users of the system. Alternatively, or additionally, in some systems, interactions with a user may occur through a presentation layer, such as presentation layer 2244. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 22, this is illustrated by virtual machine 2248. A virtual machine creates a software environment where applications/modules can execute as if they were executing on a hardware computing device. A virtual machine is hosted by a host operating system (operating system 2214) and typically, although not always, has a virtual machine monitor 2246, which manages the operation of the virtual machine 2248 as well as the interface with the host operating system (i.e., operating system 2214). A software architecture executes within the virtual machine 2248 such as an operating system 2250, libraries 2252, frameworks/middleware 2254, applications 2256 and/or presentation layer 2258. These layers of software architecture executing within the virtual machine 2248 can be the same as corresponding layers previously described or may be different.

Figure 23:
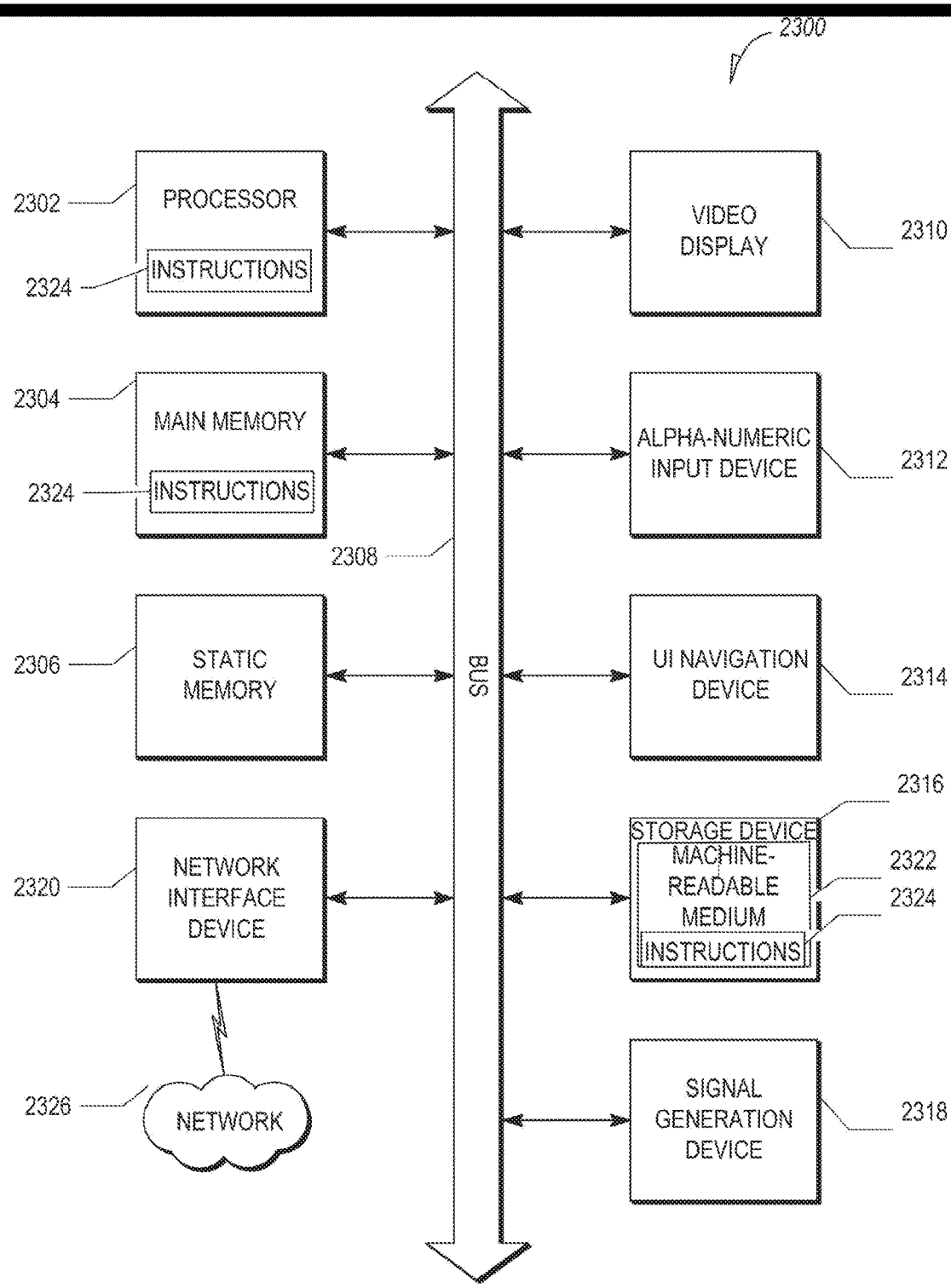
FIG. 23 is a block diagram illustrating a computing device hardware architecture, within which a set or sequence of instructions can be executed to cause the machine to perform examples of any one of the methodologies discussed herein.

FIG. 23 is a block diagram illustrating a computing device hardware architecture 2300, within which a set or sequence of instructions can be executed to cause the machine to perform examples of any one of the methodologies discussed herein. For example, the architecture 2300 may execute the software architecture 2202 described with respect to FIG. 22. The architecture 2300 may operate as a standalone device or may be connected (e.g., networked) to other machines. In a networked deployment, the architecture 2300 may operate in the capacity of either a server or a client machine in server-client network environments, or it may act as a peer machine in peer-to-peer (or distributed) network environments. The architecture 2300 can be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify operations to be taken by that machine.

Example architecture 2300 includes a processor unit 2302 comprising at least one processor (e.g., a central processing unit (CPU), a graphics processing unit (GPU) or both, processor cores, compute nodes, etc.). The architecture 2300 may further comprise a main memory 2304 and a static memory 2306, which communicate with each other via a link 2308 (e.g., bus). The architecture 2300 can further include a video display unit 2310, an alphanumeric input device 2312 (e.g., a keyboard), and a user interface (UI) navigation device 2314 (e.g., a mouse). In some examples, the video display unit 2310, input device 2312, and UI navigation device 2314 are incorporated into a touch screen display. The architecture 2300 may additionally include a storage device 2316 (e.g., a chive unit), a signal generation device 2318 (e.g., a speaker), a network interface device 2320, and one or more sensors (not shown), such as a global positioning system (GPS) sensor, compass, accelerometer, or other sensor.

In some examples, the processor unit 2302 or other suitable hardware component may support a hardware interrupt. In response to a hardware interrupt, the processor unit 2302 may pause its processing and execute an interrupt service routine (ISR), for example, as described herein.

The storage device 2316 includes a machine-readable medium 2322 on which is stored one or more sets of data structures and instructions 2324 (e.g., software) embodying or utilized by any one or more of the methodologies or functions described herein. The instructions 2324 can also reside, completely or at least partially, within the main memory 2304, static memory 2306, and/or within the processor unit 2302 during execution thereof by the architecture 2300, with the main memory 2304, static memory 2306, and the processor unit 2302 also constituting machine-readable media. Instructions stored at the machine-readable medium 2322 may include, for example, instructions for implementing the software architecture 2202, instructions for executing any of the features described herein, etc.

While the machine-readable medium 2322 is illustrated in an example to be a single medium, the term "machine-readable medium" can include a single medium or multiple media (e.g., a centralized or distributed database, and/or associated caches and servers) that store the one or more instructions 2324. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 2324 can further be transmitted or received over a communications network 2326 using a transmission medium via the network interface device 2320 utilizing any one of a number of well-known transfer protocols (e.g., Hyper Text Transfer Protocol or HTTP). Examples of communication networks include a local area network (LAN), a wide area network (WAN), the Internet, mobile telephone networks, plain old telephone (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

Various Notes & Examples

Each of the non-limiting examples described in this document can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples" Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

EXAMPLES

Example 1 is a system for configuring a configurable hardware module to perform a measurement of a physical quantity, comprising: a configuration manager configured to perform actions comprising: receiving, from a user, an indication of the physical quantity; receiving, from the user, performance factor data describing the measurement of the physical quantity; generating a hardware configuration of the hardware module for measuring the physical quantity based at least in part on the indication of the physical quantity and the performance factor data, wherein the hardware configuration comprises instruction data to configure the hardware module to execute a dynamic measurement of the physical quantity; and generating configuration data describing the hardware configuration, wherein the configuration data comprises hardware configuration data for configuring a hardware module to implement at least a portion of the hardware configuration.

In Example 2, the subject matter of Example 1 optionally includes wherein the instruction data comprises instructions that configure a control circuit of the hardware module to perform operations comprising: providing an excitation signal to a sensor; and after providing the excitation signal to the sensor, providing a modified excitation signal to the sensor.

In Example 3, the subject matter of any one or more of Examples 1-2 optionally includes wherein the instruction data comprises instructions that configure a control circuit of the hardware module to perform operations comprising: determining that a first condition is true; and after determining that the first condition is true, measuring an input signal from a sensor, wherein the input signal indicates the physical quantity.

In Example 4, the subject matter of any one or more of Examples 1-3 optionally includes wherein the hardware configuration further comprises excitation channel data for configuring an excitation channel of the hardware module for biasing a sensor to sense the physical quantity and input channel data for configuring an input channel of the hardware module for receiving a signal from the sensor indicative of the physical quantity.

In Example 5, the subject matter of any one or more of Examples 1-4 optionally includes wherein the configuration manager is further configured to perform actions comprising receiving a description of the hardware module, wherein the generating of the hardware configuration is also based at least in part on the description of the hardware module.

In Example 6, the subject matter of any one or more of Examples 1-5 optionally includes wherein the configuration manager is also configured to perform operations comprising: generating configuration data for a first candidate hardware configuration; requesting, from a simulation manager, a simulation of the first candidate hardware configuration; and receiving, from the simulation manager, first simulation data describing the simulation of the first candidate hardware configuration, wherein the generating of the hardware configuration is based at least in part on the first simulation data.

In Example 7, the subject matter of any one or more of Examples 1-6 optionally includes wherein the performance factor data comprises an indication of a sensor type for measuring the physical quantity and a measurement accuracy for measuring the physical quantity.

In Example 8, the subject matter of any one or more of Examples 1-7 optionally includes wherein the configuration manager is also configured to perform operations comprising: generating a first candidate hardware configuration; generating a second candidate hardware configuration; and receiving from the user a selection of the first candidate hardware configuration or the second candidate hardware configuration to be the hardware configuration.

In Example 9, the subject matter of Example 8 optionally includes wherein the performance factor data comprises a plurality of performance factors, and wherein configuration manager is also configured to perform operations comprising: receiving, from the user, weight data describing weights for at least a portion of the performance factors; and selecting the hardware configuration from a set of candidate hardware configurations based at least in part on the weight data.

In Example 10, the subject matter of any one or more of Examples 1-9 optionally includes wherein the hardware configuration data comprises switch network data describing a switch network state to implement the hardware configuration at the hardware module.

In Example 11, the subject matter of any one or more of Examples 1-10 optionally includes wherein the hardware configuration data comprises switch network data describing a state of a switch network of the hardware module, and wherein the state of the switch network describes: a first connection between a sensor Input/Output (I/O) connector of the hardware module and an excitation channel of the hardware module; and a second connection between the sensor I/O connection and an input channel of the hardware module.

In Example 12, the subject matter of Example 11 optionally includes wherein the hardware configuration data also comprises switch network data describing a state of a second switch network, and wherein the state of the second switch network describes: a third connection between the input channel and an analog-to-digital converter of the hardware module; and a fourth connection between the excitation channel and a digital-to-analog converter of the hardware module.

In Example 13, the subject matter of any one or more of Examples 1-12 optionally includes wherein the instruction data comprises instructions that configure a control circuit of the hardware module to perform operations comprising: providing an excitation signal to an excitation channel of the hardware module; and receiving a sensor input from an input channel of the hardware module.

In Example 14, the subject matter of any one or more of Examples 1-13 optionally includes wherein the configuration data further comprises simulation data comprising input parameters for a simulation of the hardware configuration.

In Example 15, the subject matter of Example 14 optionally includes a simulation manager, wherein the simulation manager is configured to perform operations comprising: receiving the input parameters; generating a simulation of the hardware configuration; and providing a result of the simulation of the hardware configuration to the user.

In Example 16, the subject matter of any one or more of Examples 1-15 optionally includes wherein the hardware configuration comprises: a first input channel for receiving a first sensor signal from a first sensor; a second input channel for receiving the first sensor signal; and instructions for combining an output of the first input channel and an output of the second input channel to generate a combined data stream.

Example 17 is a method for configuring a configurable hardware module to perform a measurement of a physical quantity, comprising: receiving, from a user and by at least one computing device, an indication of the physical quantity; receiving, from the user and by the at least one computing device, performance factor data describing the measurement of the physical quantity; generating, by the at least one computing device, a hardware configuration of the hardware module for measuring the physical quantity based at least in part on the indication of the physical quantity and the performance factor data, wherein the hardware configuration comprises instruction data to configure the hardware module to execute a dynamic measurement of the physical quantity; and generating, by the at least one computing device, configuration data describing the hardware configuration, wherein the configuration data comprises hardware configuration data for configuring a hardware module to implement at least a portion of the hardware configuration.

In Example 18, the subject matter of Example 17 optionally includes providing an excitation signal to a sensor; and after providing the excitation signal to the sensor, providing a modified excitation signal to the sensor.

In Example 19, the subject matter of any one or more of Examples 17-18 optionally includes determining that a first condition is true; and after determining that the first condition is true, measuring an input signal from a sensor, wherein the input signal indicates the physical quantity.

Example 20 is a machine-readable medium comprising instructions stored thereon that, when executed by a computing device, causes the computing device to perform operations comprising: receiving, from a user, an indication of a physical quantity; receiving, from the user, performance factor data describing a measurement of the physical quantity; generating a hardware configuration of a configurable hardware module for measuring the physical quantity based at least in part on the indication of the physical quantity and the performance factor data, wherein the hardware configuration comprises instruction data to configure the hardware module to execute a dynamic measurement of the physical quantity; and generating configuration data describing the hardware configuration, wherein the configuration data comprises hardware configuration data for configuring a hardware module to implement at least a portion of the hardware configuration.

The invention claimed is:

1. A system for configuring a configurable hardware module to perform a measurement of a physical quantity, comprising:
　　at least one processor unit programmed to execute actions comprising:
　　accessing, by a sweeper executed by the at least one processor unit, potential configuration data describing a plurality of potential hardware configurations, the plurality of potential hardware configurations comprising a first hardware configuration and a second hardware configuration;
　　generating, by the sweeper, simulation input parameters for at least a portion of the plurality of potential hardware configurations;
　　generating, by a simulation manager, simulation results for the plurality of potential hardware configurations, the simulation results comprising first simulation result data for the first hardware configuration and second simulation result data for the second hardware configuration, the generating based at least in part on the simulation input parameters;
　　receiving performance factor data from a user, the performance factor data comprising a plurality of performance factors and weight data describing weights for at least a portion of the performance factors;
　　selecting, by a configuration manager executed by the at least one processor unit, the first hardware configuration based at least in part on the physical quantity and performance factor data, the first hardware configuration comprising instruction data to configure the hardware module to execute a measurement of the physical quantity, the selecting based at least in part on the first simulation result data and the second simulation result data; and
　　generating, by the configuration manager, configuration data describing the first hardware configuration, the configuration data comprising hardware configuration data for configuring the hardware module to implement at least a portion of the first hardware configuration.

2. The system of claim 1, wherein the instruction data comprises instructions that configure a control circuit of the hardware module to perform operations comprising:
　　providing an excitation signal to a sensor; and
　　after providing the excitation signal to the sensor, providing a modified excitation signal to the sensor.

3. The system of claim 1, wherein the instruction data comprises instructions that configure a control circuit of the hardware module to perform operations comprising:
　　determining that a first condition is true; and
　　after determining that the first condition is true, measuring an input signal from a sensor, wherein the input signal indicates the physical quantity.

4. The system of claim 1, wherein the first hardware configuration further comprises excitation channel data for configuring an excitation channel of the hardware module for biasing a sensor to sense the physical quantity and input channel data for configuring an input channel of the hardware module for receiving a signal from the sensor indicative of the physical quantity.

5. The system of claim 1, wherein the configuration manager is further configured to perform actions comprising receiving a description of the hardware module, wherein the selecting of the first hardware configuration is also based at least in part on the description of the hardware module.

6. The system of claim 1, wherein the performance factor data comprises an indication of a sensor type for measuring the physical quantity and a measurement accuracy for measuring the physical quantity.

7. The system of claim 1, wherein the configuration manager is also configured to perform operations comprising:
providing the first hardware configuration and the second hardware configuration to the user; and
receiving from the user a selection of the first hardware configuration.

8. The system of claim 1, wherein the hardware configuration data comprises switch network data describing a switch network state to implement the first hardware configuration at the hardware module.

9. The system of claim 1, wherein the hardware configuration data comprises switch network data describing a state of a switch network of the hardware module, and wherein the state of the switch network describes: a first connection between a sensor Input/Output (I/O) connector of the hardware module and an excitation channel of the hardware module; and a second connection between the sensor I/O connection and an input channel of the hardware module.

10. The system of claim 9, wherein the hardware configuration data also comprises switch network data describing a state of a second switch network, and wherein the state of the second switch network describes: a third connection between the input channel and an analog-to-digital converter of the hardware module; and a fourth connection between the excitation channel and a digital-to-analog converter of the hardware module.

11. The system of claim 1, wherein the instruction data comprises instructions that configure a control circuit of the hardware module to perform operations comprising:
providing an excitation signal to an excitation channel of the hardware module; and
receiving a sensor input from an input channel of the hardware module.

12. The system of claim 1, wherein the first hardware configuration comprises:
a first input channel for receiving a first sensor signal from a first sensor;
a second input channel for receiving the first sensor signal; and
instructions for combining an output of the first input channel and an output of the second input channel to generate a combined data stream.

13. A method for configuring a configurable hardware module to perform a measurement of a physical quantity, comprising:
accessing, by at least one computing device, potential configuration data describing a plurality of potential hardware configurations of the hardware module, the plurality of potential hardware configurations comprising a first hardware configuration and a second hardware configuration;
generating, by the at least one computing device, simulation input parameters for at least a portion of the plurality of potential hardware configurations;
generating, by the at least one computing device, simulation results for the plurality of potential hardware configurations, the simulation results comprising first simulation result data for the first hardware configuration and second simulation result data for the second hardware configuration;
receiving, from a user and by the at least one computing device, an indication of the physical quantity;
receiving, from the user and by the at least one computing device, performance factor data describing the measurement of the physical quantity, the performance factor data comprising a plurality of performance factors and weight data describing weights for at least a portion of the performance factors;
selecting, by the at least one computing device, the first hardware configuration based at least in part on the indication of the physical quantity and the performance factor data, the first hardware configuration comprising instruction data to configure the hardware module to execute a measurement of the physical quantity, the selecting based at least in part on the first simulation result data and the second simulation result data; and
generating, by the at least one computing device, configuration data describing the first hardware configuration, the configuration data comprising hardware configuration data for configuring the hardware module to implement at least a portion of the hardware first configuration.

14. The method of claim 13, further comprising:
providing an excitation signal to a sensor; and
after providing the excitation signal to the sensor, providing a modified excitation signal to the sensor.

15. The method of claim 13, further comprising:
determining that a first condition is true; and
after determining that the first condition is true, measuring an input signal from a sensor, wherein the input signal indicates the physical quantity.

16. A non-transitory machine-readable medium comprising instructions stored thereon that, when executed by a computing device, causes the computing device to perform operations comprising:
accessing potential configuration data describing a plurality of potential hardware configurations of a configurable hardware module, the plurality of potential hardware configurations comprising a first hardware configuration and a second hardware configuration;
generating simulation input parameters for at least a portion of the plurality of potential hardware configurations;
generating simulation results for the plurality of potential hardware configurations, the simulation results comprising first simulation result data for the first hardware configuration and second simulation result data for the second hardware configuration;
receiving, from a user, an indication of a physical quantity;
receiving, from the user, performance factor data describing a measurement of the physical quantity, the performance factor data comprising a plurality of performance factors and weight data describing weights for at least a portion of the performance factors;
selecting the first hardware configuration for measuring the physical quantity based at least in part on the indication of the physical quantity and the performance factor data, the first hardware configuration comprising instruction data to configure the hardware module to execute a measurement of the physical quantity, the selecting based at least in part on the first simulation result data and the second simulation result data; and generating configuration data describing the first hardware configuration, the configuration data comprising hardware configuration data for configuring the hardware module to implement at least a portion of the first hardware configuration.

\* \* \* \* \*